(12) United States Patent
Yamamura

(10) Patent No.: US 9,045,080 B2
(45) Date of Patent: Jun. 2, 2015

(54) OBSTACLE DETECTING DEVICE

(71) Applicant: KOITO MANUFACTURING CO., LTD., Minato-ku (JP)

(72) Inventor: Satoshi Yamamura, Shizuoka (JP)

(73) Assignee: KOITO MANUFACTURING CO., LTD., Minato-Ku, Tokyo (JP)

( * ) Notice: Subject to any disclaimer, the term of this patent is extended or adjusted under 35 U.S.C. 154(b) by 0 days.

(21) Appl. No.: 14/057,172

(22) Filed: Oct. 18, 2013

(65) Prior Publication Data

US 2014/0042325 A1    Feb. 13, 2014

Related U.S. Application Data

(63) Continuation of application No. PCT/JP2012/002360, filed on Apr. 4, 2012.

(30) Foreign Application Priority Data

Apr. 22, 2011 (JP) ................ 2011-096421

(51) Int. Cl.
*G01J 5/02* (2006.01)
*B60Q 1/06* (2006.01)
(Continued)

(52) U.S. Cl.
CPC ............. *B60Q 1/06* (2013.01); *B60Q 1/0023* (2013.01); *B60Q 2300/45* (2013.01);
(Continued)

(58) Field of Classification Search
CPC ............. B60Q 2300/45; F21S 48/1145; F21S 48/1757
USPC ........................................... 250/347
See application file for complete search history.

(56) References Cited

U.S. PATENT DOCUMENTS 5,831,717 A * 11/1998 Ikebuchi .............. 356/4.01
6,229,597 B1   5/2001 Kikuchi
(Continued)

FOREIGN PATENT DOCUMENTS

CN   1403317 A    3/2003
CN   101054078 A   10/2007
(Continued)

OTHER PUBLICATIONS

International Search Report (Form PCT/ISA/210) issued on Jul. 17, 2012, by the Japanese Patent Office in corresponding International Application No. PCT/JP2012/002360. (4 pages).
(Continued)

*Primary Examiner* — Mark R Gaworecki
*Assistant Examiner* — Kenneth J Malkowski
(74) *Attorney, Agent, or Firm* — Buchanan Ingersoll & Rooney PC

(57) ABSTRACT

An obstacle detecting device includes: a light source having both LED units each for emitting visible light and an infrared light unit for emitting infrared light; and a rotating reflector configured to be rotated in one direction around a rotational shaft while reflecting the visible light and the infrared light emitted from the light source. The rotating reflector is configured, by its rotating movement: to emit the visible light from each of the LED units as an irradiation beam such that a first light distribution pattern is formed by scanning with the irradiation beam; and to emit the infrared light from the infrared light unit as an irradiation beam such that a second light distribution pattern is formed by scanning with the irradiation beam.

4 Claims, 29 Drawing Sheets

(51) Int. Cl.
  *B60Q 1/00* (2006.01)
  *F21S 8/10* (2006.01)
  *G08G 1/16* (2006.01)
  *B60Q 1/08* (2006.01)

(52) U.S. Cl.
  CPC ........ *F21S 48/1136* (2013.01); *F21S 48/1159* (2013.01); *F21S 48/137* (2013.01); *F21S 48/1757* (2013.01); *G08G 1/166* (2013.01); *B60Q 1/085* (2013.01); *F21S 48/1747* (2013.01); *B60Q 2300/056* (2013.01); *B60Q 2300/124* (2013.01); *B60Q 2300/41* (2013.01); *F21S 48/325* (2013.01); *G08G 1/165* (2013.01)

(56) References Cited

U.S. PATENT DOCUMENTS

| | | |
|---|---|---|
| 2008/0094851 A1 | 4/2008 | Engl et al. |
| 2009/0015388 A1 | 1/2009 | Yagi et al. |
| 2009/0046474 A1 | 2/2009 | Sato et al. |

FOREIGN PATENT DOCUMENTS

| | | |
|---|---|---|
| DE | 199 32 975 A1 | 2/2000 |
| DE | 10 2005 020 085 A1 | 11/2006 |
| DE | 10 2008 022 795 A1 | 11/2009 |
| EP | 0 291 475 A2 | 11/1988 |
| JP | 2006-252264 A | 9/2006 |
| JP | 2007-234479 A | 9/2007 |
| JP | 2008-143505 A | 6/2008 |
| JP | 2009-018726 A | 1/2009 |
| JP | 2009-154615 A | 7/2009 |

OTHER PUBLICATIONS

Notification Concerning Transmittal of International Preliminary Report on Patentability (Forms PCT/IB/326 and PCT/IB/373) and the Written Opinion of the International Searching Authority (Form PCT/ISA/237) issued on Oct. 31, 2013, by the International Bureau of WIPO in corresponding International Application No. PCT/JP2012/002360. (9 pages).

The extended European Search Report issued on Sep. 23, 2014, by the European Patent Office in corresponding European Patent Application No. 12773730.2-1756. (7 pages).

Office Action (Notification of Reason(s) for Refusal) issued on Nov. 11, 2014, by the Japan Patent Office in corresponding Japanese Patent Application No. 2011-096421, and an English Translation of the Office Action. (8 pages).

The First Office Action issued on Mar. 26, 2015 by the State Intellectual Property Office of the People's Republic of China in corresponding Chinese Patent Application No. 201280019734.3. (14 pages).

\* cited by examiner

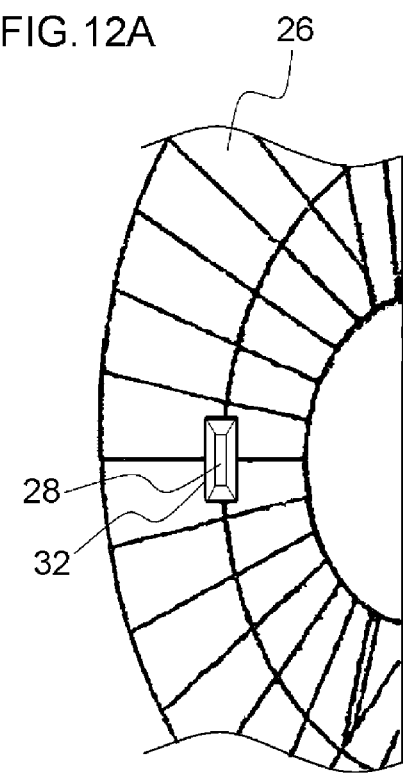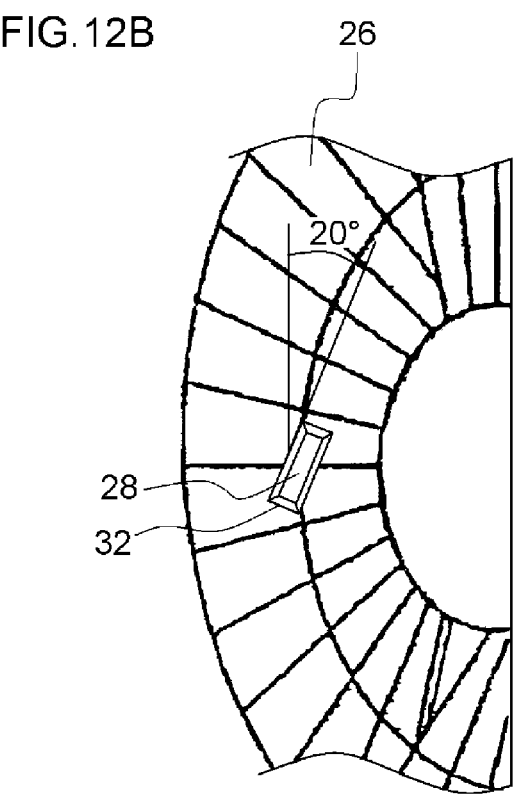

IR LIGHT INTENSITY

PH_IR

PL

IR LIGHT
INTENSITY

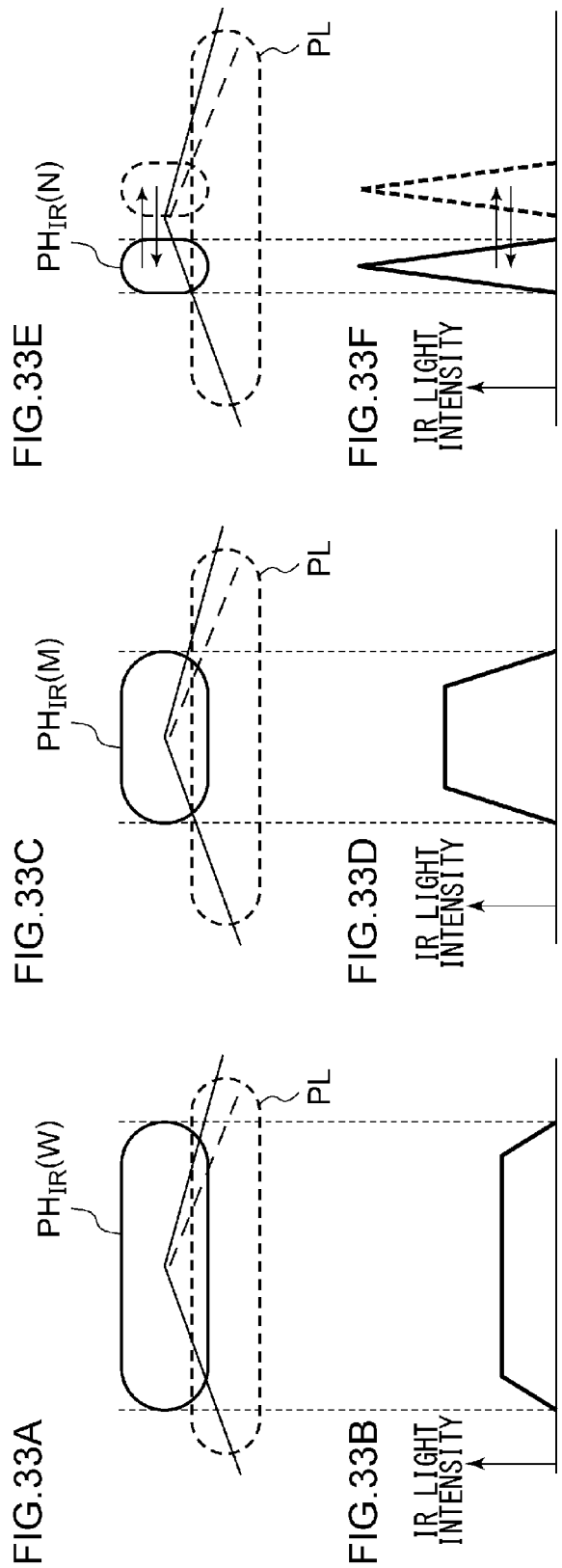

OBSTACLE DETECTING DEVICE

CROSS-REFERENCE TO RELATED APPLICATIONS

This application is based upon and claims the benefit of priority from the prior Japanese Patent Application No. 2011-096421, filed on Apr. 22, 2011, and International Patent Application No. PCT/JP 2012/002360, filed on Apr. 4, 2012, the entire content of each of which is incorporated herein by reference.

BACKGROUND OF THE INVENTION

1. Field of the Invention

The present invention relates to an obstacle detecting device.

2. Description of the Related Art

A various methods of detecting a vehicle-in-front, a pedestrian, or an obstacle, which is present in front of a vehicle, have been devised before. Patent Document 1 discloses an obstacle detecting device by which an obstacle around a vehicle is detected based on a reflective wave of laser light that has been emitted from a laser light source mounted on the vehicle in order to scan and irradiate a detection area around the vehicle.

Patent Document 2 discloses an automotive lighting device including both an infrared sensor for detecting an object around a vehicle by infrared light and a visible light source for emitting visible light onto an object when the infrared sensor detects the object. In this automotive lighting device, a region in front of the vehicle is scanned in a predetermined pattern by infrared light reflected by a reflecting mirror that reciprocates and turns.

PATENT DOCUMENTS

[Patent Document 1] Japanese Patent Application Publication No. 2006-252264

[Patent Document 2] Japanese Patent Application Publication No. 2009-18726

SUMMARY OF THE INVENTION

A light distribution variable technique has been devised, in which, when a vehicle is present in a partial region of a light distribution pattern for high-beam, the partial region is made not to be partially irradiated such that glare is not provided to the vehicle. In this state, however, even if an obstacle is present in the non-irradiation region, it is difficult for a driver to recognize the situation.

The present invention has been made in view of these situations, and a purpose of the invention is to provide a technique in which the accuracy in detecting an obstacle is improved while light distribution by visible light is being controlled.

In order to solve the aforementioned problem, an obstacle detecting device according to an aspect of the present invention comprises: a light source including both a first light emitting element for emitting visible light and a second light emitting element for emitting infrared light; and a rotating reflector configured to be rotated in one direction around a rotational shaft while reflecting the visible light and the infrared light emitted from the light source. The rotating reflector is configured, by its rotating movement: to emit the visible light from the first light emitting element as an irradiation beam such that a first light distribution pattern is formed by scanning with the irradiation beam; and to emit the infrared light from the second light emitting element as an irradiation beam such that a second light distribution pattern is formed by scanning with the irradiation beam.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 12A is a view illustrating a state where a compound paraboloidal concentrator including an LED is arranged such that the longitudinal direction thereof is aligned with the vertical direction;

FIG. 12B is a view illustrating a state where the compound paraboloidal concentrator is arranged such that the longitudinal direction thereof is inclined with respect to the vertical direction;

FIG. 33A is a view schematically illustrating an example of a light distribution pattern when a wide irradiation range is selected in the irradiation range change mode;

FIG. 33B is a view illustrating a change in the infrared light (IR) intensity in an infrared light distribution pattern $PH_{IR}$ (W) in FIG. 33A;

FIG. 33C is a view schematically illustrating an example of a light distribution pattern when a normal irradiation range is selected in the irradiation range change mode;

FIG. 33D is a view illustrating a change in the infrared light (IR) intensity in an infrared light distribution pattern $PH_{IR}$ (M) in FIG. 33C;

FIG. 33E is a view schematically illustrating an example of a light distribution pattern when a narrow irradiation range is selected in the irradiation range change mode; and FIG. 33F is a view illustrating a change in the infrared light (IR) intensity in an infrared light distribution pattern $PH_{IR}$ (N) in FIG. 33E.

DETAILED DESCRIPTION OF THE INVENTION

Figure 1:
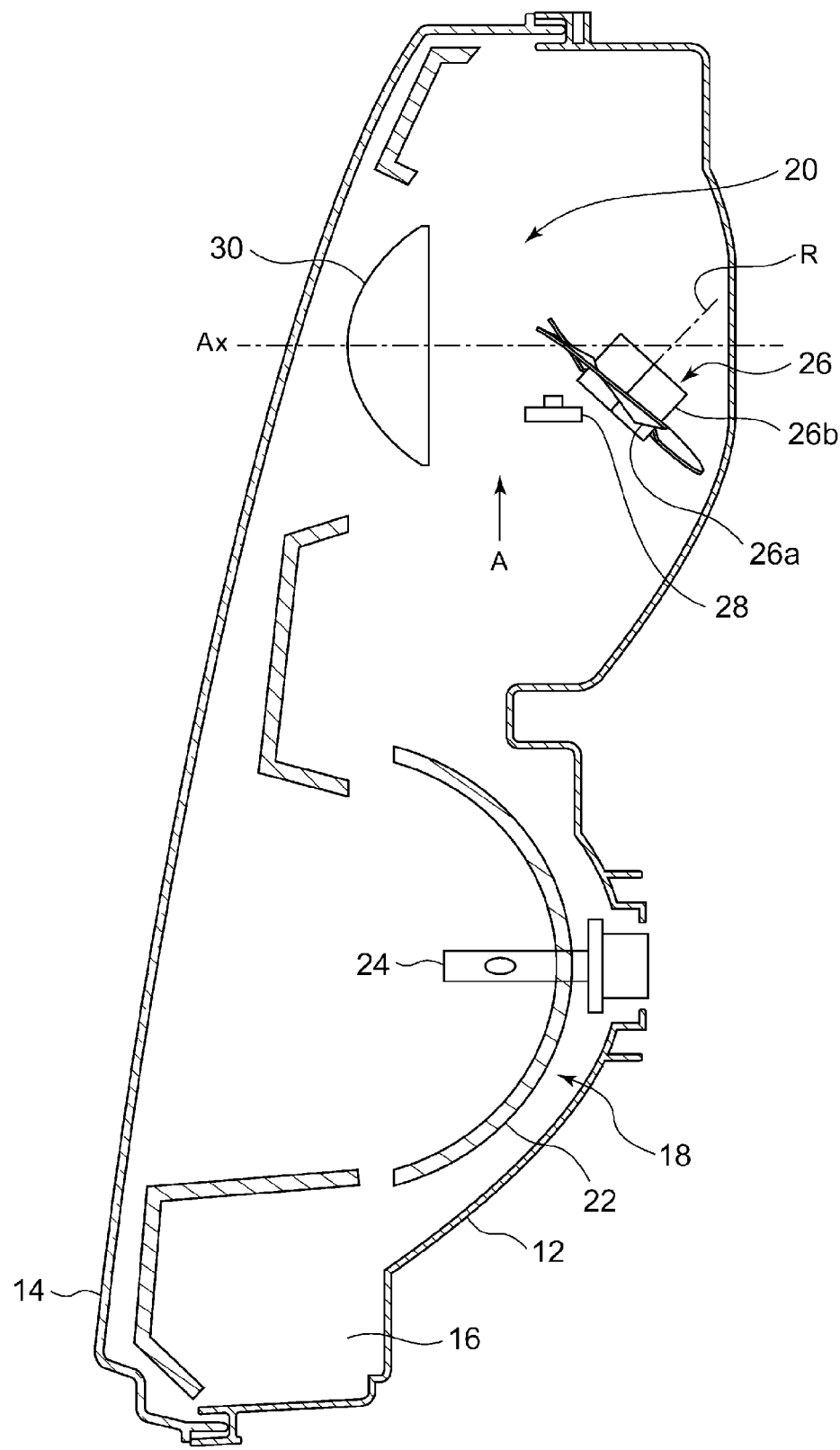
FIG. 1 is a horizontal sectional view of an automotive headlamp according to the present embodiment.

An obstacle detecting device according to an aspect of the present invention comprises: a light source including both a first light emitting element for emitting visible light and a second light emitting element for emitting infrared light; and a rotating reflector configured to be rotated in one direction around a rotational shaft while reflecting the visible light and the infrared light emitted from the light source. The rotating reflector is configured, by its rotating movement: to emit the visible light from the first light emitting element as an irradiation beam such that a first light distribution pattern is formed by scanning with the irradiation beam; and to emit the infrared light from the second light emitting element as an irradiation beam such that a second light distribution pattern is formed by scanning with the irradiation beam.

According to this aspect, a first light distribution pattern, due to scanning with an irradiation beam by visible light, and a second light distribution pattern, due to scanning with an irradiation beam by infrared light, can be formed by an action of the rotating reflector.

The rotational shaft may be provided to be approximately parallel to a scanning plane of the irradiation beam that scans in the horizontal direction by the rotation of the rotating reflector. Thereby, the thickness of the obstacle detecting device can be made small. Herein, the expression of being approximately parallel means that it is acceptable to be substantially parallel, without requiring that it is completely parallel. Accordingly, an error within a range not greatly impairing the advantages of the obstacle detecting device according to an aspect is acceptable.

The obstacle detecting device may further comprise a controller configured to control turning on/off of each of the first light emitting element and the second light emitting element. The controller may have a control mode in which: the lighting of the first light emitting element is turned off or reduced at a timing when the irradiation beam by the visible light scans a partial region of the first light distribution pattern; and the second light emitting element is turned on at a timing when the irradiation beam by the infrared light scans another region including the partial region. Thereby, the partial region, which has been scanned in a state where the lighting of the first light emitting element is turned off or reduced, can be scanned while the second light emitting element is being turned on.

The obstacle detecting device may further comprise: an imaging unit having a sensitivity in an infrared spectral range; and a determination unit configured to determine whether an obstacle, which can impair traveling of a vehicle, is present in the partial region based on an image acquired by the imaging unit. When the obstacle is present in the partial region, the controller may control the turning on of the first light emitting element such that the obstacle is irradiated by the irradiation beam by the visible light. Thereby, when an obstacle is present in the partial region, a driver can easily recognize the situation.

The controller may control the turning on of the first light emitting element such that a range of a region including the obstacle irradiated by the irradiation beam by the visible light is changed in accordance with a distance between a driver's vehicle and the obstacle. Thereby, a light distribution pattern, suitable for the distance between a driver's vehicle and an obstacle, can be formed by visible light.

The invention will now be described by reference to the preferred embodiments. This does not intend to limit the scope of the present invention, but to exemplify the invention.

Hereinafter, the present invention will be described based on preferred embodiments and with reference to accompanying drawings. The same or like components, members, or processes illustrated in each view are denoted by the same reference numeral, and duplicative description thereof will be appropriately omitted. The preferred embodiments are illustratively described without limiting the invention, and all of the features and combinations thereof described in the preferred embodiments are not necessarily essential to the invention.

The aforementioned obstacle detecting device can also have a function as an optical unit included in an automotive lamp. Accordingly, both an optical unit and an automotive lamp comprising the optical unit, which can be applied to the obstacle detecting device, will be first described in detail in the following embodiments. The optical unit according to the embodiments can be used in various automotive lamps, but hereinafter, the case where it is applied to an automotive headlamp will be described.

(First Embodiment)

FIG. 1 is a horizontal sectional view of an automotive headlamp according to the present embodiment. An automotive headlamp 10 is a right side headlamp mounted on the right side of the front end portion of an automobile, and has the same structure as that of a headlamp mounted on the left side, except that the two structures are symmetrical to each other. Accordingly, the right side automotive headlamp 10 will be described in detail hereinafter, and description of the left side automotive headlamp will be omitted.

As illustrated in FIG. 1, the automotive headlamp 10 includes a lamp body 12 having a concave portion that is opened toward the front. The front opening of the lamp body 12 is covered with a transparent front cover 14 to form a lamp chamber 16. The lamp chamber 16 functions as a space in which two lamp units 18 and 20 are housed in a state where they are arranged to be aligned with each other in the vehicle width direction.

Of these lamp units, the lamp unit 20 arranged outside, i.e., arranged on the upper side illustrated in FIG. 1 in the right side automotive headlamp 10, is a lamp unit including a lens and is configured to radiate a variable high-beam. On the other hand, of these lamp units, the lamp unit 18 arranged inside, i.e., arranged on the lower side illustrated in FIG. 1 in the right side automotive headlamp 10, is configured to radiate a low-beam.

The lamp unit 18 for low-beam includes a reflector 22, a light source bulb (incandescent bulb) 24 supported by the reflector 22, and a non-illustrated shade; and the reflector 22 is supported tiltably with respect to the lamp body 12 by non-illustrated known means, for example, by means using aiming screws and nuts.

As illustrated in FIG. 1, the lamp unit 20 includes a rotating reflector 26, an LED 28, and a convex lens 30 as a projection lens arranged ahead of the rotating reflector 26. Alternatively, a semiconductor light emitting element, such as an EL element, LD element, or the like, may be used as a light source, instead of the LED 28. A light source, in which turning on/off can be accurately performed in a short time, is preferred particularly for the control by which part of a light distribution pattern is shielded from light, which will be described later. The shape of the convex lens 30 may be appropriately selected in accordance with a required light distribution pattern or a light distribution characteristic, such as an illuminance distribution, but an aspheric lens or a free-form surface lens is used. In the present embodiment, an aspheric lens is used as the convex lens 30.

The rotating reflector 26 is rotated in one direction around a rotational shaft R by a drive source, such as a non-illustrated motor. The rotating reflector 26 includes a reflecting surface configured to form a desired light distribution pattern by reflecting the light emitted from the LED 28 while being rotated. In the present embodiment, the rotating reflector 26 forms an optical unit.

Figure 2:
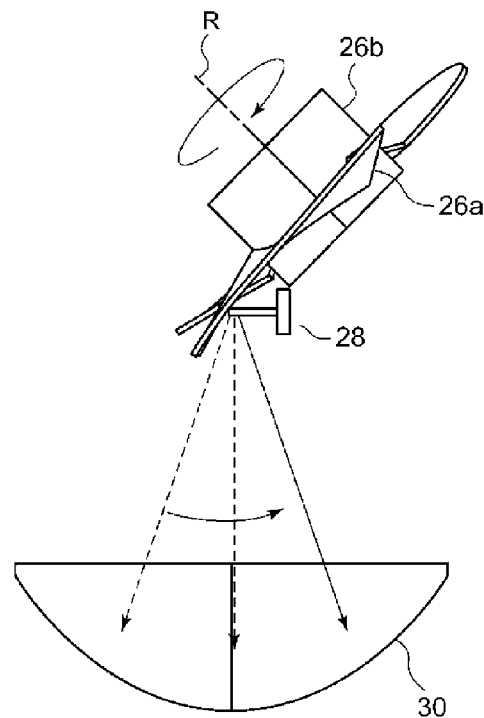
FIG. 2 is a top view schematically illustrating a configuration of a lamp unit including an optical unit according to the present embodiment.
Figure 3:
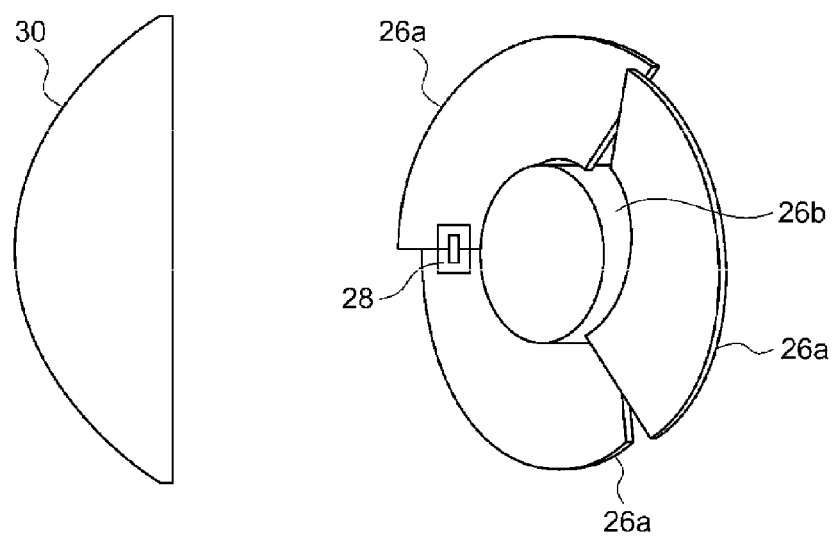
FIG. 3 is a side view in which the lamp unit is viewed from A Direction illustrated in FIG. 1.

FIG. 2 is a top view schematically illustrating the configuration of the lamp unit 20 including the optical unit according to the present embodiment. FIG. 3 is a side view in which the lamp unit 20 is viewed from A Direction illustrated in FIG. 1.

In the rotating reflector 26, three blades 26a, each of which functions as a reflecting surface and has the same shape as those of the others, are provided around a tubular rotating part 26b. The rotational shaft R of the rotating reflector 26 is inclined with respect to an optical axis Ax and provided in a plane including the optical axis Ax and the LED 28. In other words, the rotational shaft R is provided to be approximately parallel to a scanning plane of the light (irradiation beam) from the LED 28, the light scanning in the horizontal direction by the rotation of the rotating reflector 26. Thereby, the thickness of the optical unit can be made small. The scanning plane used herein can be understood, for example, as a fan-shaped plane formed by continuously connecting the trajectories of the light from the LED 28 that is scanning light.

In the lamp unit 20 according to the present embodiment, the size of the LED 28 included therein is relatively small, and the position at which the LED 28 is arranged is present between the rotating reflector 26 and the convex lens 30 and is shifted from the optical axis Ax. Accordingly, the length in the depth direction (the vehicle front-back direction) of the automotive headlamp 10 can be made smaller than that of the case where a light source, a reflector, and a lens are aligned in a line on an optical axis, as in a lamp unit in a conventional projector system.

The shape of each of the blades 26a in the rotating reflector 26 is configured such that a secondary light source of the LED 28, generated by being reflected, is formed near to the focal point of the convex lens 30. In addition, each of the blades 26a has a twisted shape in which the angle between the optical axis Ax and the reflecting surface is changed moving toward the circumferential direction around the rotational axis R. Thereby, scanning using the light from the LED 28 can be performed, as illustrated in FIG. 2. This point will be further described in detail.

FIGS. 4A to 4E are perspective views illustrating situations of the blades in accordance with rotating angles of the rotating reflector 26 in the lamp unit according to the present embodiment. FIGS. 4F to 4J are views for explaining that a direction, in which the light from the light source is reflected, is changed in accordance with the states of FIGS. 4A to 4E.

Figure 4A:
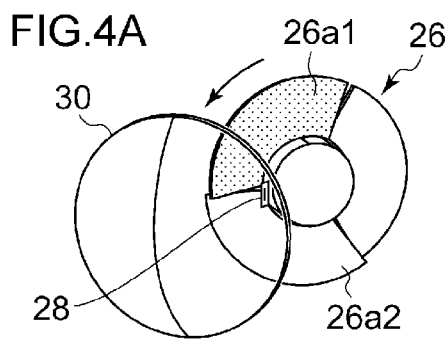
FIGS. 4A to 4J are perspective views illustrating situations of blades in accordance with rotating angles of a rotating reflector in the lamp unit according to the present embodiment.
Figure 4B:
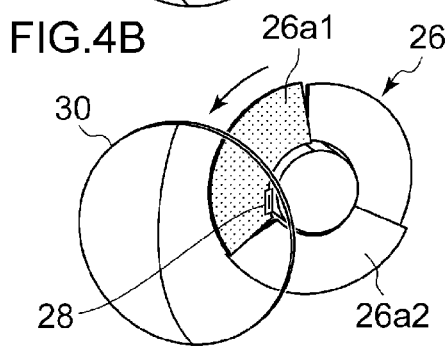

FIG. 4A illustrates a state where the LED 28 is arranged so as to irradiate a boundary region between two blades 26a1 and 26a2. In this state, the light from the LED 28 is reflected by a reflecting surface S of the blade 26a1 and reflected in a direction inclined with respect to the optical axis Ax, as illustrated in FIG. 4F. As a result, of a region in front of a vehicle where a light distribution pattern is formed, one of both the left and right end portions is irradiated. When it is in a state illustrated in FIG. 4B after the rotating reflector 26 is rotated, the reflecting surface S (reflection angle) of the blade 26a1 that reflects the light from the LED 28 is changed, because the blade 26a1 is twisted. As a result, the light from the LED 28 is reflected in a direction nearer to the optical axis Ax than to the reflection direction illustrated in FIG. 4F, as illustrated in FIG. 4G.

Figure 4C:
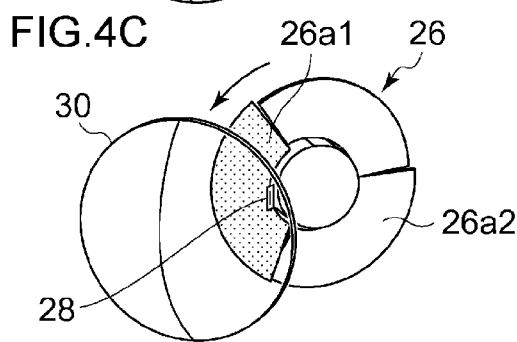
Figure 4D:
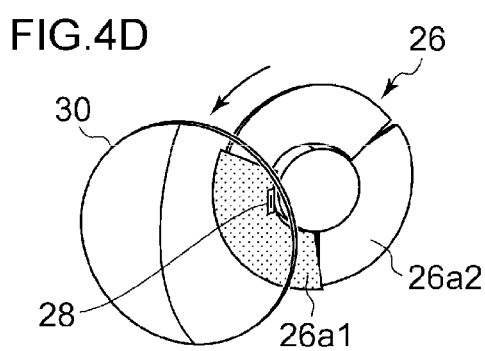
Figure 4E:
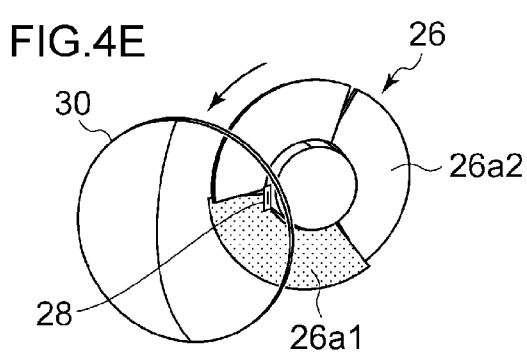
Figure 4F:
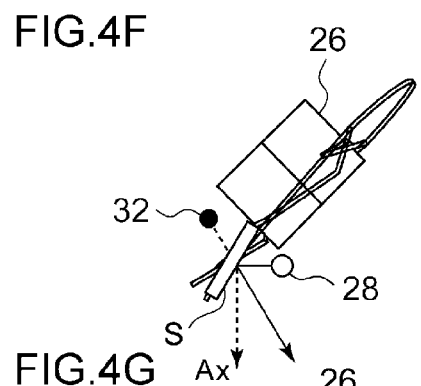
Figure 4G:
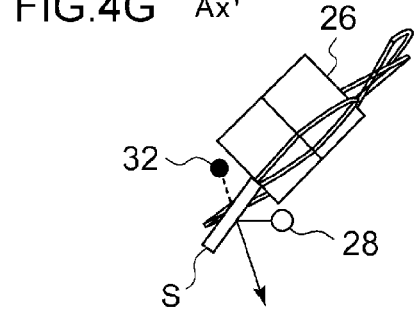
Figure 4H:
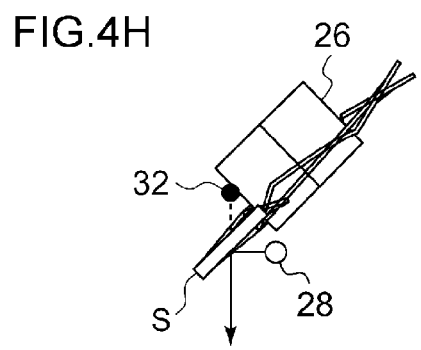
Figure 4I:
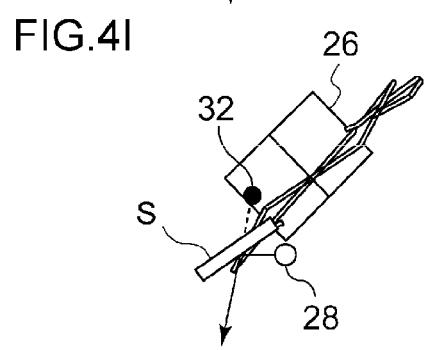
Figure 4J:
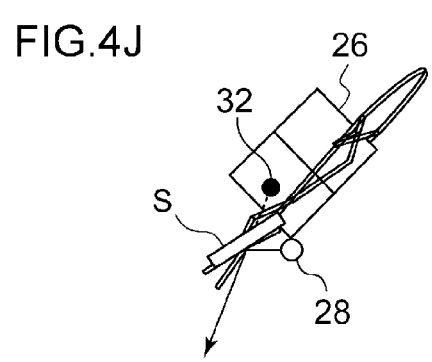
Figure 5A:
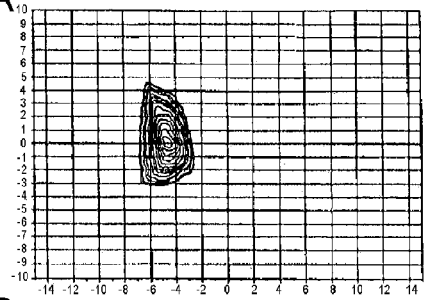
FIGS. 5A to 5E are views illustrating projected images in which the rotating reflector is at scanning positions corresponding to the states of FIGS. 4F to 4J, respectively.
Figure 5B:
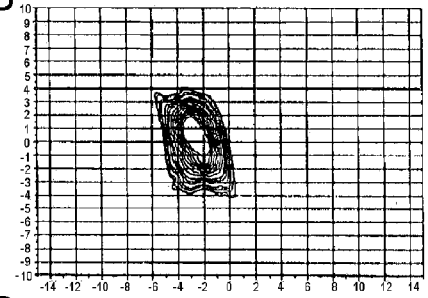
Figure 5C:
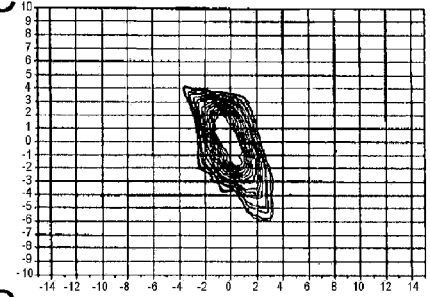
Figure 5D:
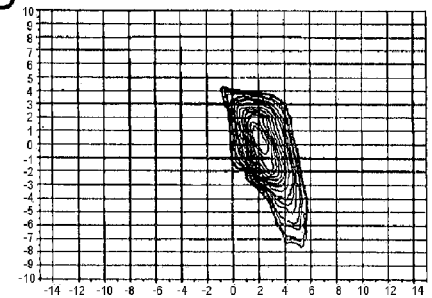
Figure 5E:
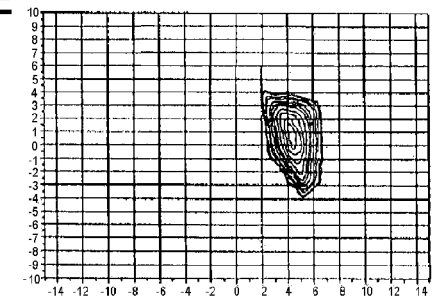

Subsequently, when the rotating reflector 26 is rotated as illustrated in FIGS. 4C, 4D, and 4E, the reflection direction of the light from the LED 28 is changed toward the other end of both the left and right end portions, of the region in front of a vehicle where a light distribution pattern is formed. The rotating reflector 26 according to the present embodiment is configured to be able to scan a forward region in one direction (horizontal direction) and one time with the light from the LED 28, when rotated by 120°. In other words, when one of the blades 26a passes in front of the LED 28, a desired region in front of a vehicle is scanned one time by the light from the LED 28. As illustrated in FIGS. 4F to 4J, a secondary light source (light source virtual image) 32 is moved in the horizontal direction near to the focal point of the convex lens 30. The number of the blades 26a, the shape thereof, and the rotating speed of the rotating reflector 26 are appropriately set based on the results of experiments or simulations, taking into consideration the characteristics of a required light distribution pattern and flickering of an image to be scanned. In addition, a motor is preferred as a drive unit whose rotating speed can be changed in accordance with various light distribution control. Thereby, a timing at which scanning is performed can be easily changed. As such a motor, a motor from which information on rotation timing can be acquired is preferred. Specifically, a DC brushless motor is preferred. When a DC brushless motor is used, information on rotation timing can be acquired from the motor itself, and hence equipment, such as an encoder, can be omitted.

Thus, in the rotating reflector 26 according to the present embodiment, the front of a vehicle can be scanned in the horizontal direction by using the light from the LED 28, when the shape and rotating speed of the blades 26a are devised. FIGS. 5A to 5E are views illustrating projected images in which the rotating reflector is at scanning positions corresponding to the states of FIGS. 4F to 4J, respectively. The unit of each of the vertical axis and the horizontal axis is degree (°), and irradiation ranges and irradiation positions are illustrated. As illustrated in FIGS. 5A to 5E, a projected image is moved in the horizontal direction by the rotation of the rotating reflector 26.

Figure 6A:
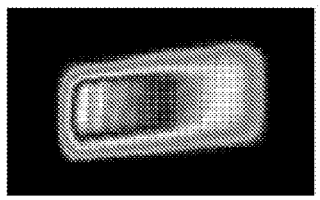
FIG. 6A is a view illustrating a light distribution pattern when a range of ±5° in the horizontal direction with respect to an optical axis is scanned by using the automotive headlamp according to the present embodiment.
Figure 6C:
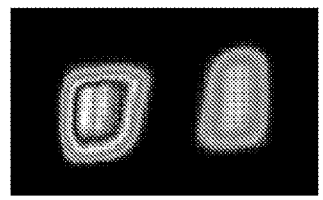
FIG. 6C is a view illustrating a state where a region of a light distribution pattern is shielded from light by using the automotive headlamp according to the present embodiment.
Figure 6E:
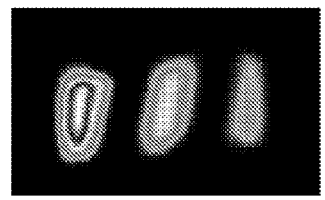
FIG. 6E is a view illustrating a state where a plurality of regions of a light distribution pattern are shielded from light by using the automotive headlamp according to the present embodiment.
Figure 6B:
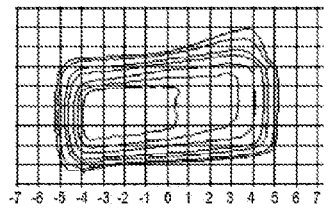
FIG. 6B is a view illustrating a light intensity distribution of the light distribution pattern illustrated in FIG. 6A.
Figure 6D:
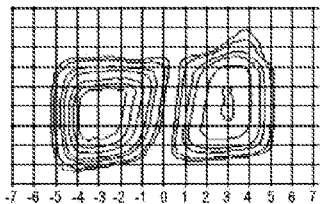
FIG. 6D is a view illustrating a light intensity distribution of the light distribution pattern illustrated in FIG. 6C.
Figure 6F:
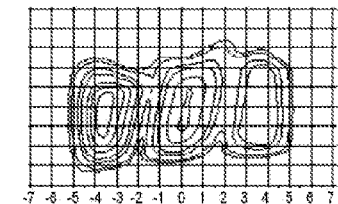
FIG. 6F is a view illustrating a light intensity distribution of the light distribution pattern illustrated in FIG. 6E.

FIG. 6A is a view illustrating a light distribution pattern when a range of ±5° in the horizontal direction with respect to the optical axis is scanned by using the automotive headlamp according to the present embodiment, FIG. 6B is a view illustrating a light intensity distribution of the light distribution pattern illustrated in FIG. 6A, FIG. 6C is a view illustrating a state where a region of a light distribution pattern is shielded from light by using the automotive headlamp according to the present embodiment, FIG. 6D is a view illustrating a light intensity distribution of the light distribution pattern illustrated in FIG. 6C, FIG. 6E is a view illustrating a state where a plurality of regions of a light distribution pattern are shielded from light by using the automotive headlamp according to the present embodiment, and FIG. 6F is a view illustrating a light intensity distribution of the light distribution pattern illustrated in FIG. 6E.

As illustrated in FIG. 6A, the automotive headlamp 10 according to the present embodiment can form a light distribution pattern for high-beam, having a shape whose horizontal length is substantially long, by reflecting the light from the LED 28 with the rotating reflector 26 to scan a forward region with the reflected light. Thus, a desired light distribution pattern can be formed by the rotation in one direction of the rotating reflector 26, and hence it is not needed to be driven by a particular mechanism, such as a resonant mirror, and further limitations on the size of the reflecting surface are smaller than those on a resonant mirror. Accordingly, the light emitted from the light source can be used efficiently in lighting by selecting the rotating reflector 26 having a larger reflecting surface. That is, a maximum light intensity in a light distribution pattern can be enhanced. The rotating reflector 26 according to the present embodiment has a diameter approximately the same as that of the convex lens 30, and the area of the blades 26a can be made large in accordance with the diameter.

In addition, the automotive headlamp 10 comprising the optical unit according to the present embodiment can form a light distribution pattern for high-beam, in which an arbitrary region is shielded from light as illustrated in FIGS. 6C and 6E, by synchronizing the timing of turning on/off the LED 28 or a change in the emitted light intensity with the rotation of the rotating reflector 26. In addition, when a light distribution patter for high-beam is formed by changing the emitted light intensity of (by turning on/off) the LED 28 so as to be synchronized with the rotation of the rotating reflector 26, control can also be performed, in which the light distribution pattern is swiveled itself by shifting the phase of the change in the light intensity.

As described above, the automotive headlamp according to the present embodiment can form a light distribution pattern by scanning with the light from the LED, and can also form a light-shielded portion arbitrarily in part of the light distribution pattern by controlling a change in the emitted light intensity. Accordingly, a desired region can be accurately shielded from light by LEDs, the number of which is smaller than that of the case where a light-shielded portion is formed by turning off part of a plurality of LEDs. Further, the automotive headlamp 10 can form a plurality of light-shielded portions, and hence, even when a plurality of vehicles are present forward, the regions corresponding to the respective vehicles can be shielded from light.

Furthermore, the automotive headlamp 10 can perform light-shielding control without moving a basic light distribution pattern, and hence an uncomfortable feeling, which may be provided to a driver when light-shielding control is performed, can be reduced. Furthermore, the automotive headlamp 10 can swivel a light distribution pattern without moving the lamp unit 20, and hence the mechanism of the lamp unit 20 can be simplified. Accordingly, the automotive headlamp 10 is only required to include, as a drive unit for light distribution variable control, a motor necessary for the rotation of the rotating reflector 26, thereby the configuration of the automotive headlamp 10 can be simplified and it can be manufactured at low cost and in a small size.

In addition, the rotating reflector 26 according to the present embodiment also serves as a cooling fan for sending air to the LED 28 that is arranged in front of the rotating reflector 26, as illustrated in FIGS. 1 and 2. Accordingly, it is not needed to provide a cooling fan and a rotating reflector separately from each other, and hence the configuration of the optical unit can be simplified. In addition, by air cooling the LED 28 with the wind generated in the rotating reflector 26, a heat sink for cooling the LED 28 can be omitted or miniaturized, and hence the optical unit can be reduced in size, cost, and weight.

Alternatively, such a cooling fan is not necessarily required to have a function of directly sending air to the light source, and a cooling fan for generating a convection current in a heat release unit, such as a heat sink, may be adopted. The rotating reflector 26 and a heat sink may be arranged such that the LED 28 is cooled, for example, by generating, with the wind generated by the rotating reflector 26, a convection current near to a heat release unit, such as a heat sink, which is provided separately from the LED 28. Alternatively, the heat release unit may also be part of the light source, not only being a separate member, such as a heat sink.

(Second Embodiment)

Figure 7A:
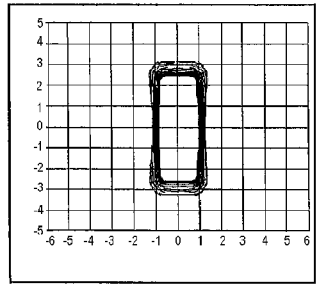
FIG. 7A is a view illustrating a projected image generated when the light from an LED is reflected by a plane mirror and then projected by an aspheric lens.
Figure 7B:
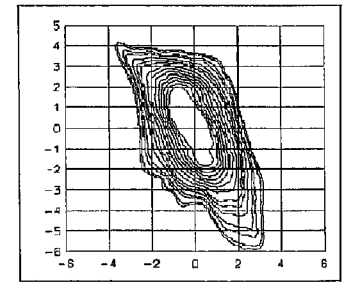
FIG. 7B is a view illustrating a projected image in an automotive headlamp according to First Embodiment.
Figure 7C:
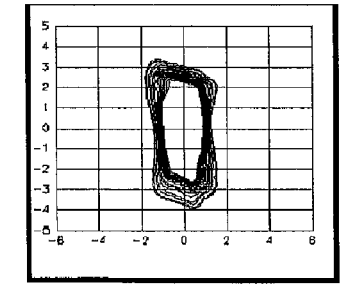
FIG. 7C is a view illustrating a projected image in an automotive headlamp according to Second Embodiment.

When the light from an LED is reflected and projected forward by a projection lens, the shape of a projected image does not necessarily match the shape of the light emitting surface of the LED. FIG. 7A is a view illustrating a projected image generated when the light from an LED is reflected by a plane mirror and then projected by an aspheric lens, FIG. 7B is a view illustrating a projected image in the automotive headlamp according to First Embodiment, and FIG. 7C is a view illustrating a projected image in an automotive headlamp according to Second Embodiment.

If a reflecting surface is planar, a projected image is similar to the shape of the light emitting surface of an LED, as illustrated in FIG. 7A. However, the blades 26a, which serve as reflecting surfaces, are twisted in the rotating reflector 26 according to First Embodiment, and hence a projected image is distorted as illustrated in FIG. 7B. Specifically, a projected image is blurred (irradiation range is widened) and inclined in First Embodiment. Accordingly, there are sometimes the cases where the shapes of a light distribution pattern and a light-shielded portion, which are formed by scanning a projected image, are inclined and a boundary between the light-shielded portion and an irradiated portion is unclear.

Figure 8:
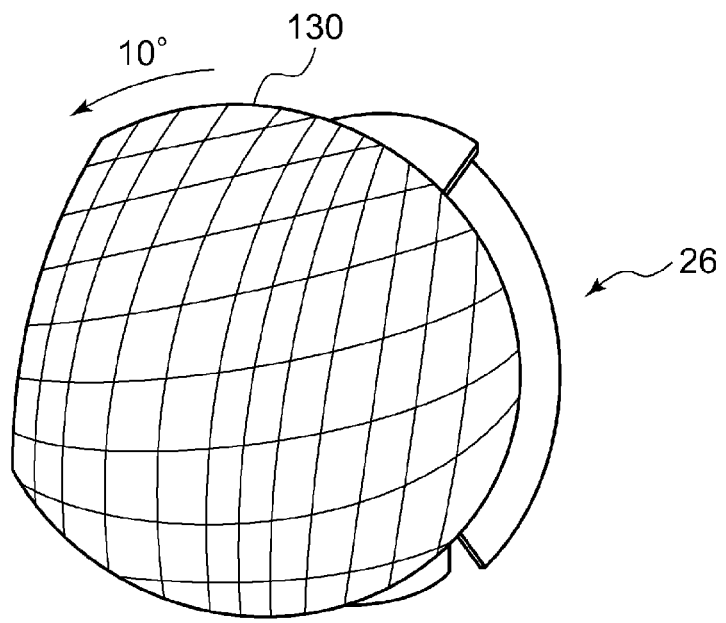
FIG. 8 is a front view of an optical unit according to Second Embodiment.
Figure 9A:
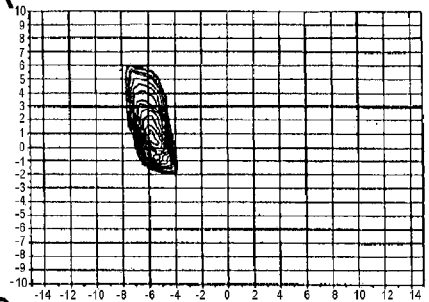
FIGS. 9A to 9E are views illustrating projected images in each of which a rotating reflector is rotated by 30° from the previous state in the optical unit according to the Second Embodiment.
Figure 9B:
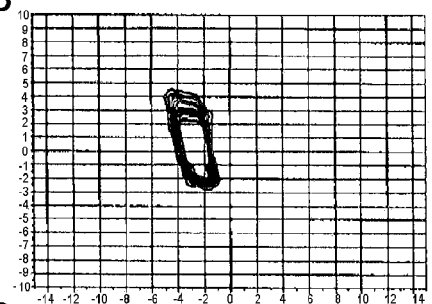
Figure 9C:
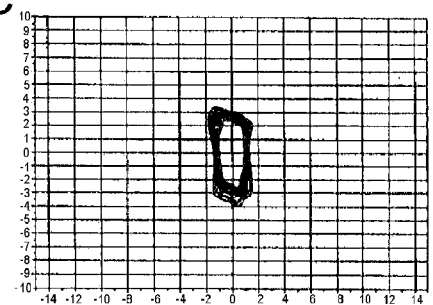
Figure 9D:
Figure 9E:
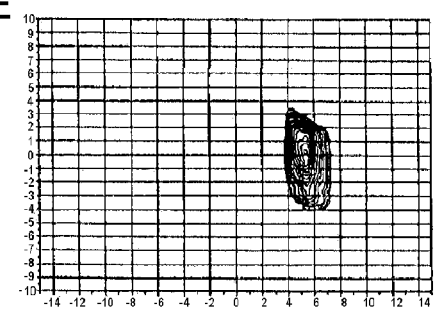

Accordingly, in Second Embodiment, an optical unit is configured to correct a distorted image by reflecting light with a curved surface. Specifically, a free-form surface lens is used as the convex lens, in an automotive headlamp according to Second Embodiment. FIG. 8 is a front view of the optical unit according to Second Embodiment.

The optical unit according to Second Embodiment includes the rotating reflector 26 and a projection lens 130. The projection lens 130 projects the light reflected by the rotating reflector 26 in a direction in which the optical unit radiates light. The projection lens 130 is a free-form surface lens by which an image of an LED, which has been distorted by being reflected with the reflecting surface of the rotating reflector 26, is corrected so as to be close to the shape of a light source itself (shape of the light emitting surface of the LED). The shape of the free-form surface lens may be appropriately designed in accordance with the twist or shape of a blade. In the optical unit according to the present embodiment, the image is corrected to be a shape close to a rectangle that is the shape of a light source, as illustrated in FIG. 7C.

FIGS. 9A to 9E are views illustrating projected images in each of which the rotating reflector is rotated by 30° from the previous state in the optical unit according to the Second Embodiment. As illustrated in FIGS. 9A to 9E, projected images, which are less blurred than those in First Embodiment, are formed, and hence a desired region can be irradiated accurately with bright light.

Figure 10A:
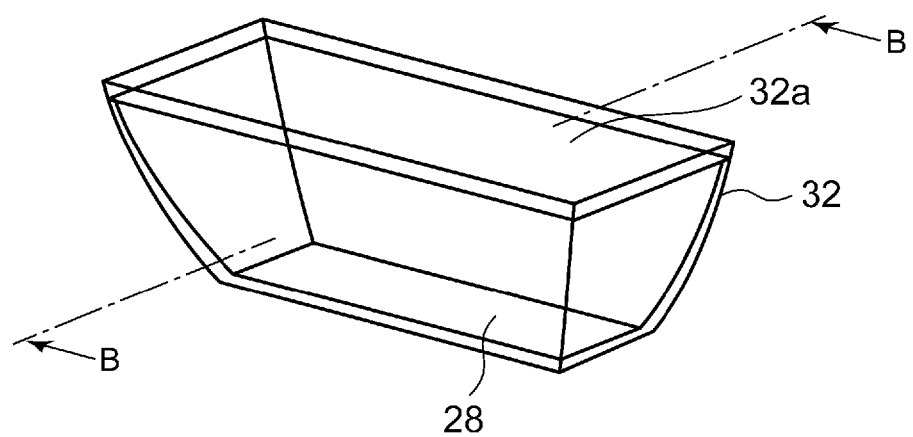
FIG. 10A is a perspective view of a light source according to Second Embodiment.
Figure 10B:
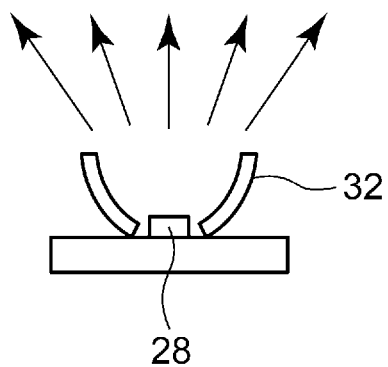
FIG. 10B is a sectional view, taken along B-B Line in FIG. 10A.

The light emitted from the LED 28 is spread as it is, and hence part of the light sometimes becomes useless without being reflected by the rotating reflector 26. Even if reflected by the rotating reflector 26, the resolution for a light-shielded portion tends to be decreased when a projected image becomes large. Accordingly, a light source in the present embodiment is formed by both the LED 28 and a CPC (Compound Parabolic Concentrator) 32 that concentrates the light from the LED 28. FIG. 10A is a perspective view of a light source according to Second Embodiment, and FIG. 10B is a sectional view, taken along B-B Line in FIG. 10A.

The CPC 32 is a concentrator having a box shape, on the bottom of which the LED 28 is arranged. The four side surfaces of the CPC 32 have been subjected to mirror finishing such that each of them has a parabolic shape whose focal point is located at the LED 28 or a region near thereto. Thereby, the light emitted by the LED 28 is concentrated and reflected forward. In this case, it can be assumed that an opening 32a of the CPC 32, the opening 32a having a rectangular shape, is the light emitting surface of the light source.

(Third Embodiment)

In the optical unit according to Second Embodiment, the shape of a projected image can be corrected to be a shape close to a rectangle that is the shape of the light source by an action of the free-form surface lens. However, when a light distribution pattern is formed by scanning a projected image thus corrected, there is still room for improvement.

Figure 11A:
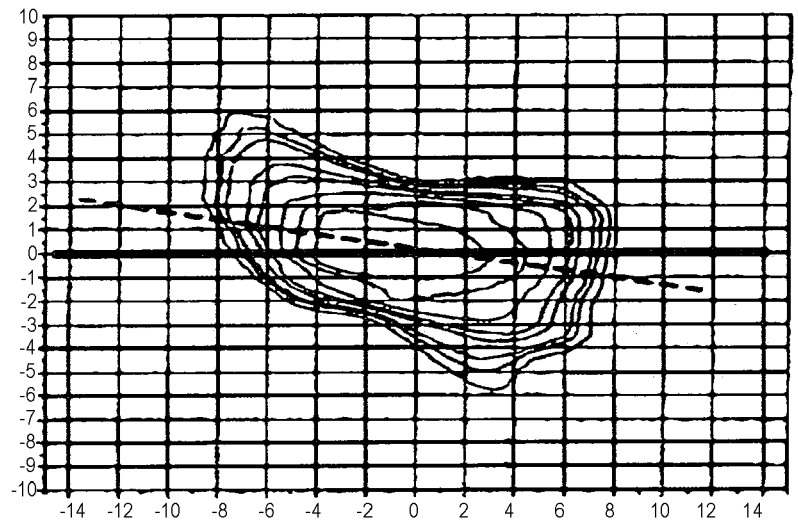
FIG. 11A is a view illustrating an irradiation pattern formed by the optical unit according to Second Embodiment.
Figure 11B:
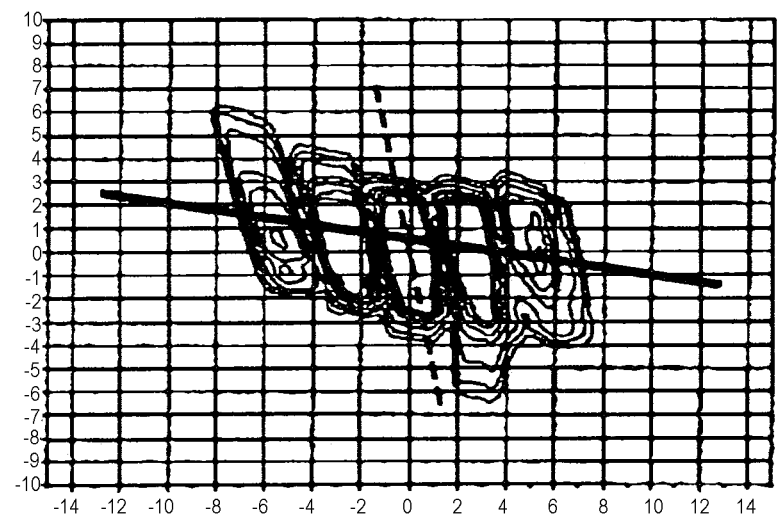
FIG. 11B is a view illustrating a state where projected images formed by the optical unit according to Second Embodiment are combined.

FIG. 11A is a view illustrating an irradiation pattern formed by the optical unit according to Second Embodiment, and FIG. 11B is a view illustrating a state where projected images formed by the optical unit according to Second Embodiment are combined. FIG. 12A is a view illustrating a state where the CPC 32 including the LED 28 is arranged such that the longitudinal direction thereof is aligned with the vertical direction, and FIG. 12B is a view illustrating a state where the CPC 32 is arranged such that the longitudinal direction thereof is inclined with respect to the vertical direction.

When a light source is in the state illustrated in FIG. 12A, an irradiation pattern is inclined by approximately 10° with respect to the horizontal line, as illustrated in FIG. 11A. In addition, when a light source is in the state illustrated in FIG. 12A, each projected image is inclined by approximately 20° with respect to the vertical line, as illustrated in FIG. 11B. Accordingly, a configuration for correcting these inclinations will be described in the present embodiment.

At first, the inclination of an irradiation pattern can be corrected by rotating the whole optical system, including the projection lens 130 (see FIG. 8) that is a free-form surface lens, the rotating reflector 26, and the LED 28, by 10° with respect to the optical axis. In addition, the inclination of each projected image can be corrected by inclining a light source including the LED 28 and the CPC 32. Specifically, the light emitting surface of the light source is provided in a state where each side of the light emitting surface is inclined by 20° with respect to the vertical direction such that a projected image, which is projected forward by the projection lens 130, is close to upright, as illustrated in FIG. 12B.

Figure 13A:
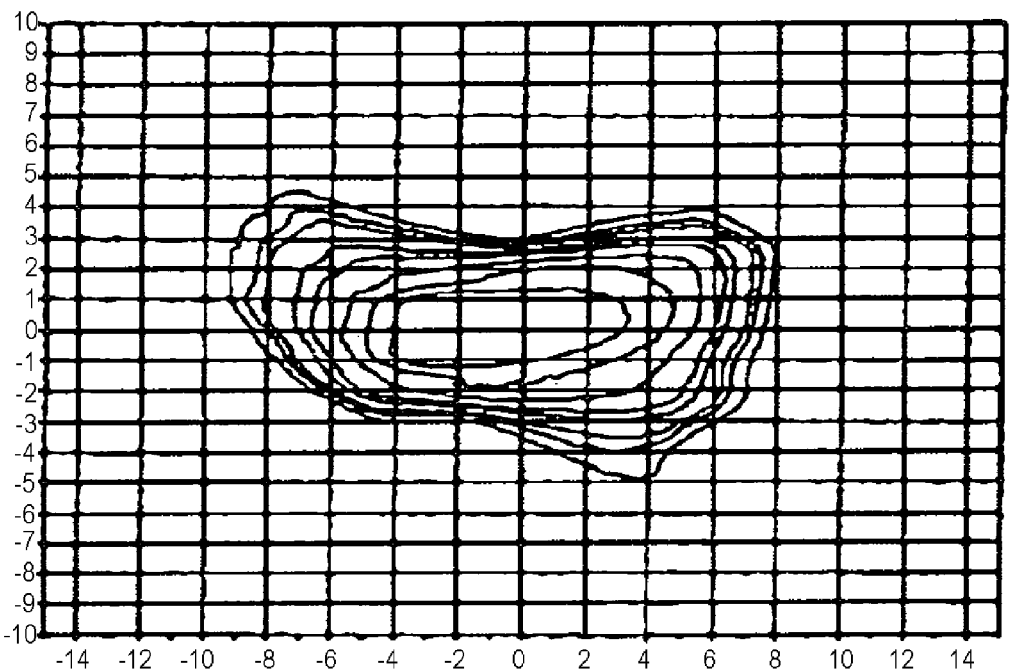
FIG. 13A is a view illustrating an irradiation pattern formed by an optical unit according to Third Embodiment.
Figure 13B:
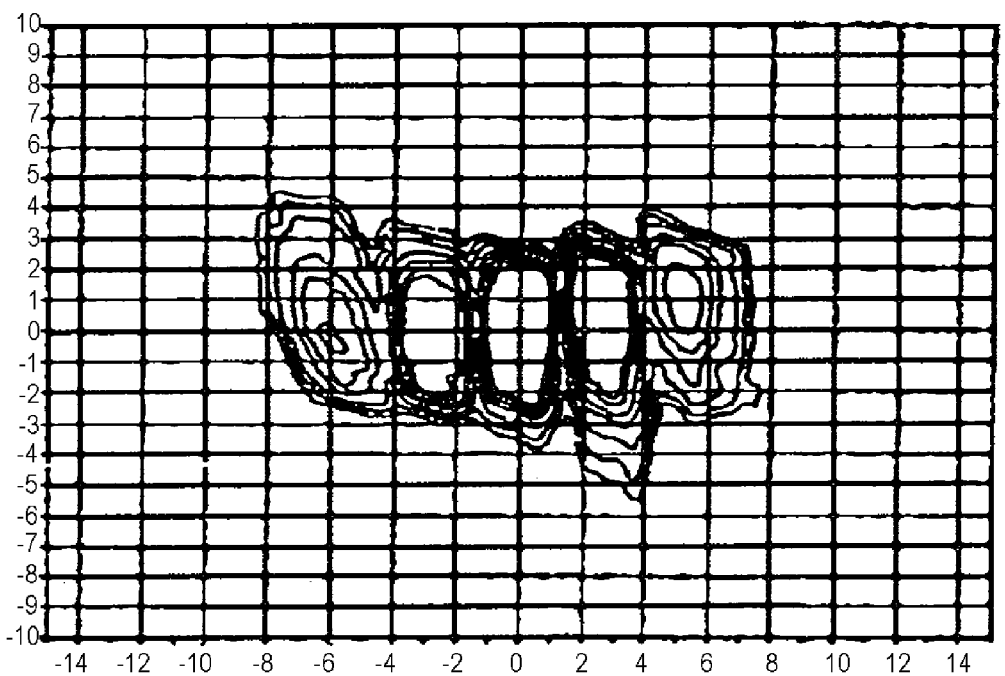
FIG. 13B is a view illustrating a state where projected images formed by the optical unit according to Third Embodiment are combined.

FIG. 13A is a view illustrating an irradiation pattern formed by an optical unit according to Third Embodiment, and FIG. 13B is a view illustrating a state where projected images formed by the optical unit according to Third Embodiment are combined. As illustrated in the views, the inclinations of an irradiation pattern and each projected image are corrected, and an ideal light distribution pattern can be formed. In addition, an irradiation pattern and a projected image can be corrected only by inclining the whole optical system including the projection lens 130, the LED 28, and the rotating reflector 26, and hence adjustment for acquiring a desired light distribution pattern can be easily performed.

(Fourth Embodiment)

As in the optical units according to the aforementioned embodiments, a light distribution pattern for high-beam can be formed by a single light source. However, the case where a further bright irradiation pattern is required or the case where an LED with a further low light intensity is used for cost reduction is considered. Accordingly, an optical unit including a plurality of light sources will be described in the present embodiment.

Figure 14:
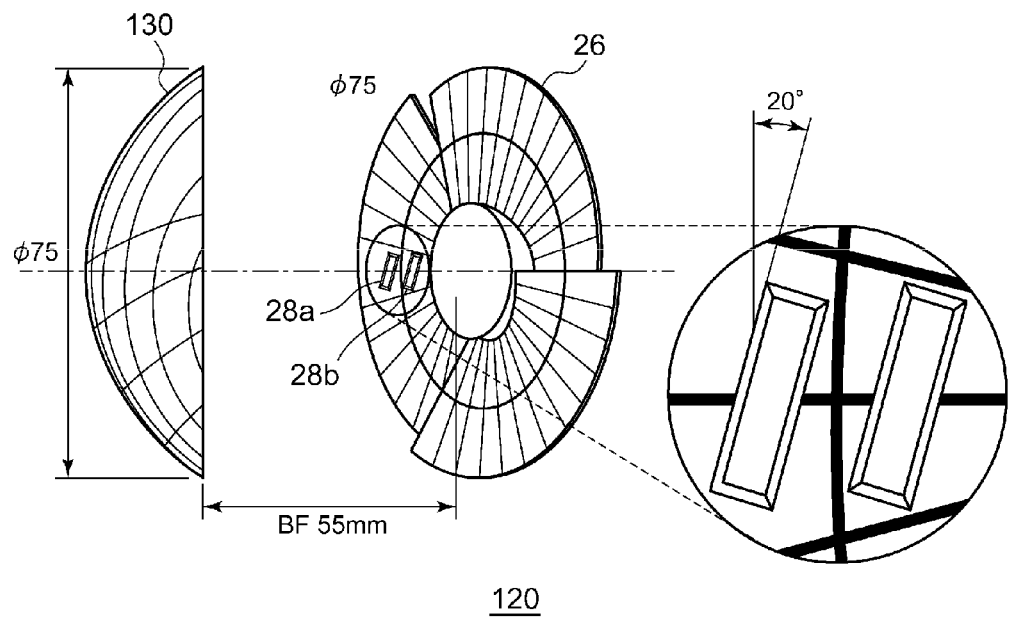
FIG. 14 is a side view schematically illustrating a lamp unit according to Fourth Embodiment.
Figure 15:
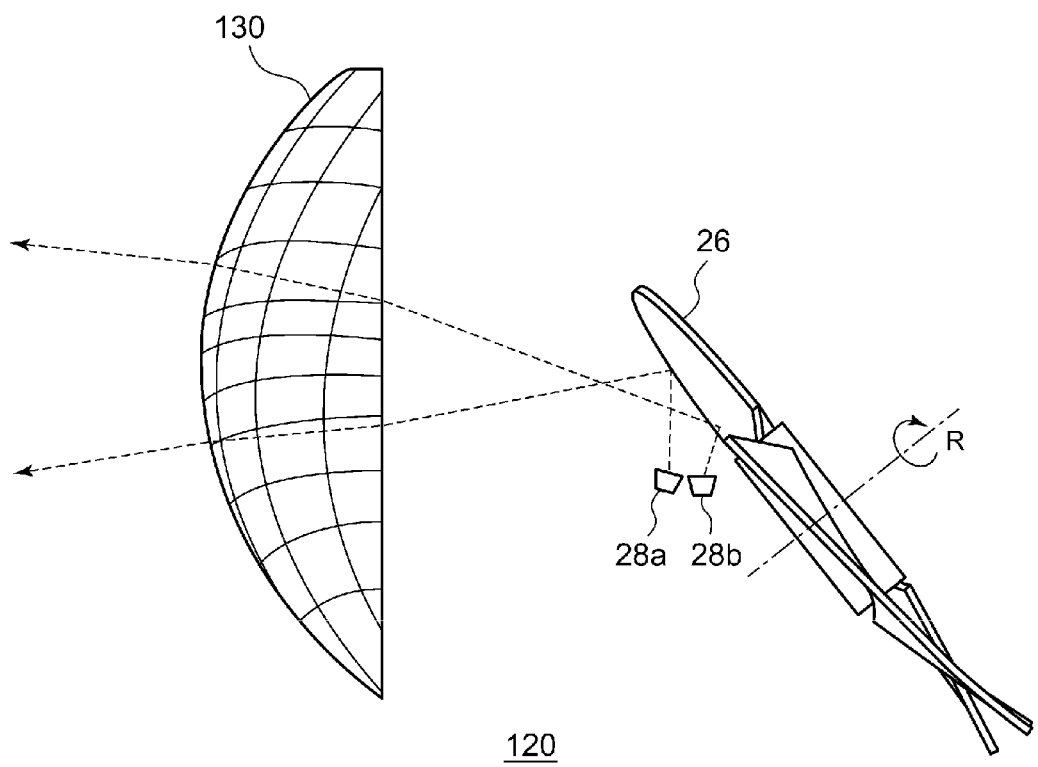
FIG. 15 is a top view schematically illustrating the lamp unit according to Fourth Embodiment.
Figure 16:
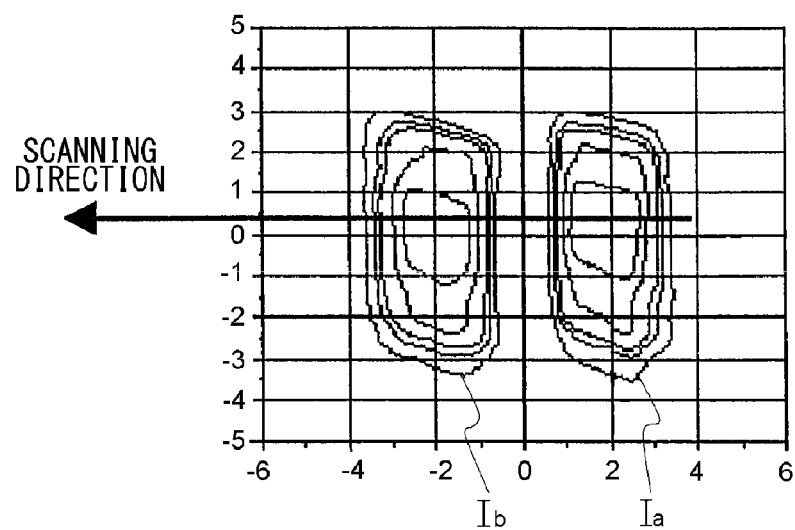
FIG. 16 is a view illustrating a projected image occurring when the rotating reflector is in the state illustrated in FIG. 14.

FIG. 14 is a side view schematically illustrating a lamp unit according to Fourth Embodiment. FIG. 15 is a top view schematically illustrating the lamp unit according to Fourth Embodiment. A lamp unit 120 according to Fourth Embodiment includes the projection lens 130, the rotating reflector 26, and two LEDs 28a and 28b. FIG. 16 is a view illustrating a projected image occurring when the rotating reflector 26 is in the state illustrated in FIG. 14. A projected image Ia is formed by the light from the LED 28a arranged forward, i.e., arranged near to the projection lens 130, while a projected image Ib is formed by the light from the LED 28b arranged backward, i.e., arranged away from the projection lens 130.

Figure 17A:
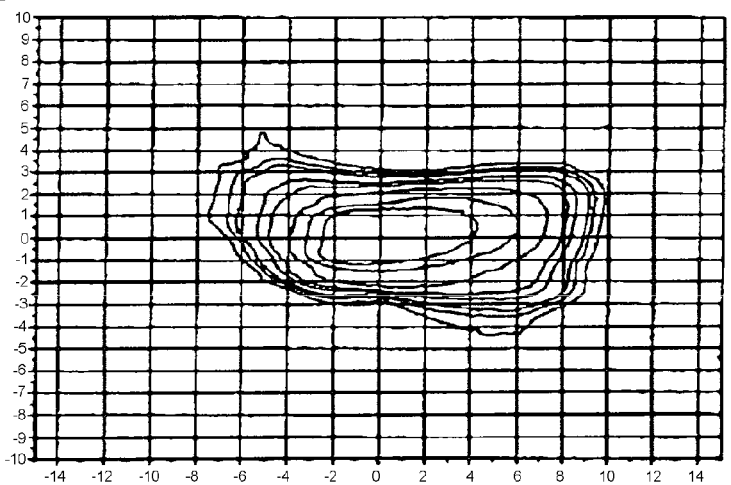
FIG. 17A is a view illustrating a light distribution pattern formed by an LED arranged forward.
Figure 17B:
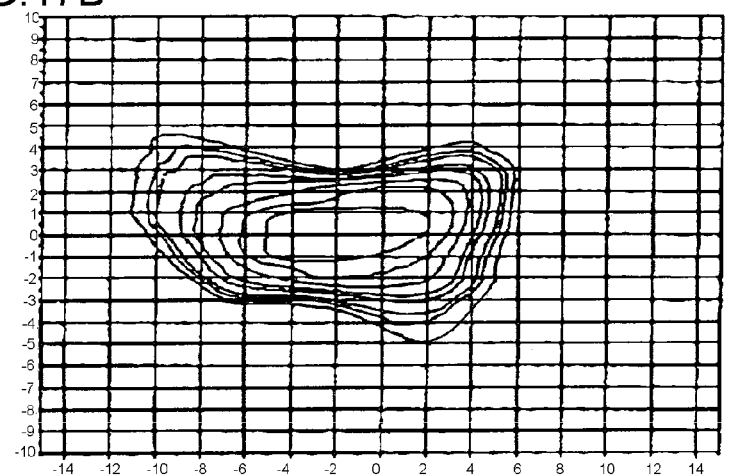
FIG. 17B is a view illustrating a light distribution pattern formed by an LED arranged backward.
Figure 17C:
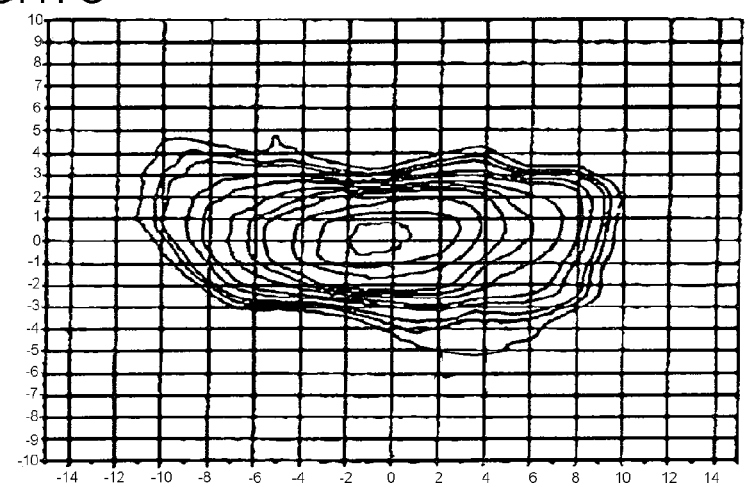
FIG. 17C is a view illustrating a combined light distribution pattern formed by the two LEDs.

FIG. 17A is a view illustrating a light distribution pattern formed by the LED 28a arranged forward, FIG. 17B is a view illustrating a light distribution pattern formed by the LED 28b arranged backward, and FIG. 17C is a view illustrating a combined light distribution pattern formed by the two LEDs. As illustrated in FIG. 17C, a desired light distribution pattern can also be formed by using a plurality of LEDs. In addition, a maximum light intensity, which is difficult to be attained by a single LED alone, is attained in the combined light distribution pattern.

Figure 18A:
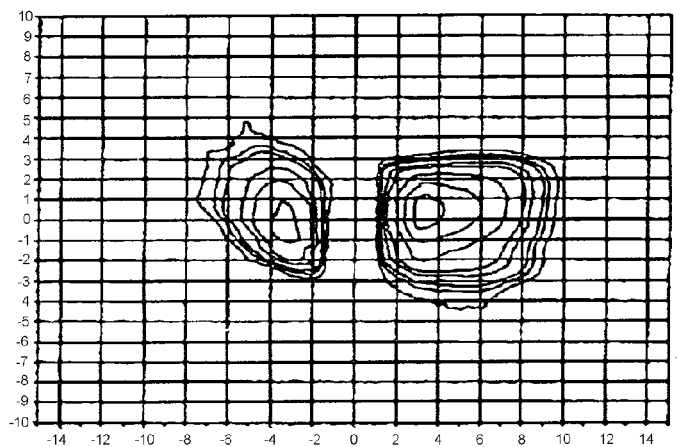
FIG. 18A is a view illustrating a light distribution pattern having a light-shielded portion formed by the LED arranged forward.
Figure 18B:
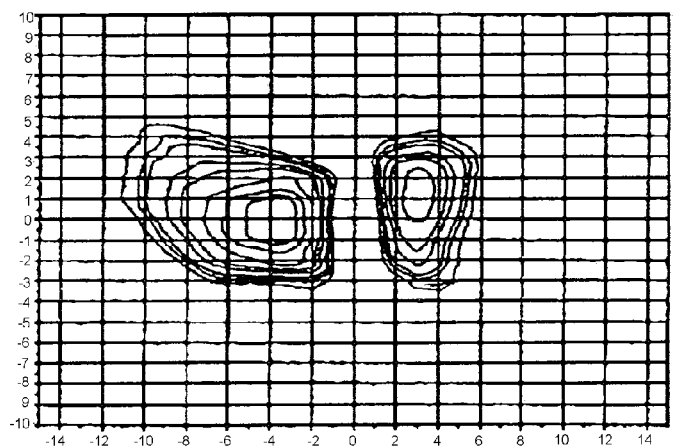
FIG. 18B is a view illustrating a light distribution pattern having a light-shielded portion formed by the LED arranged backward.
Figure 18C:
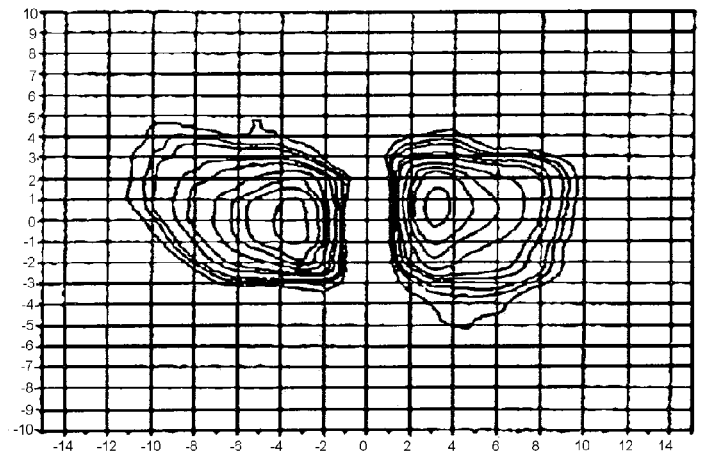
FIG. 18C is a view illustrating a combined light distribution pattern having a light-shielded portion formed by the two LEDs.

Subsequently, the case where a light-shielded portion is formed in a light distribution pattern by using the lamp unit 120 will be described. FIG. 18A is a view illustrating a light distribution pattern having a light-shielded portion formed by the LED 28a arranged forward, FIG. 18B is a view illustrating a light distribution pattern having a light-shielded portion formed by the LED 28b arranged backward, and FIG. 18C is a view illustrating a combined light distribution pattern having a light-shielded portion formed by the two LEDs. In order to form the light distribution patterns illustrated in FIGS. 18A and 18B, the timings of turning on/off the respective LEDs are appropriately shifted from each other to match the positions of the respective light-shielded portions. As illustrated in FIG. 18C, a desired light distribution pattern having a light-shielded portion can also be formed by using a plurality of LEDs. In addition, a maximum light intensity, which is difficult to be attained by a single LED, is attained in the combined light distribution pattern.

(Fifth Embodiment)

Figure 19:
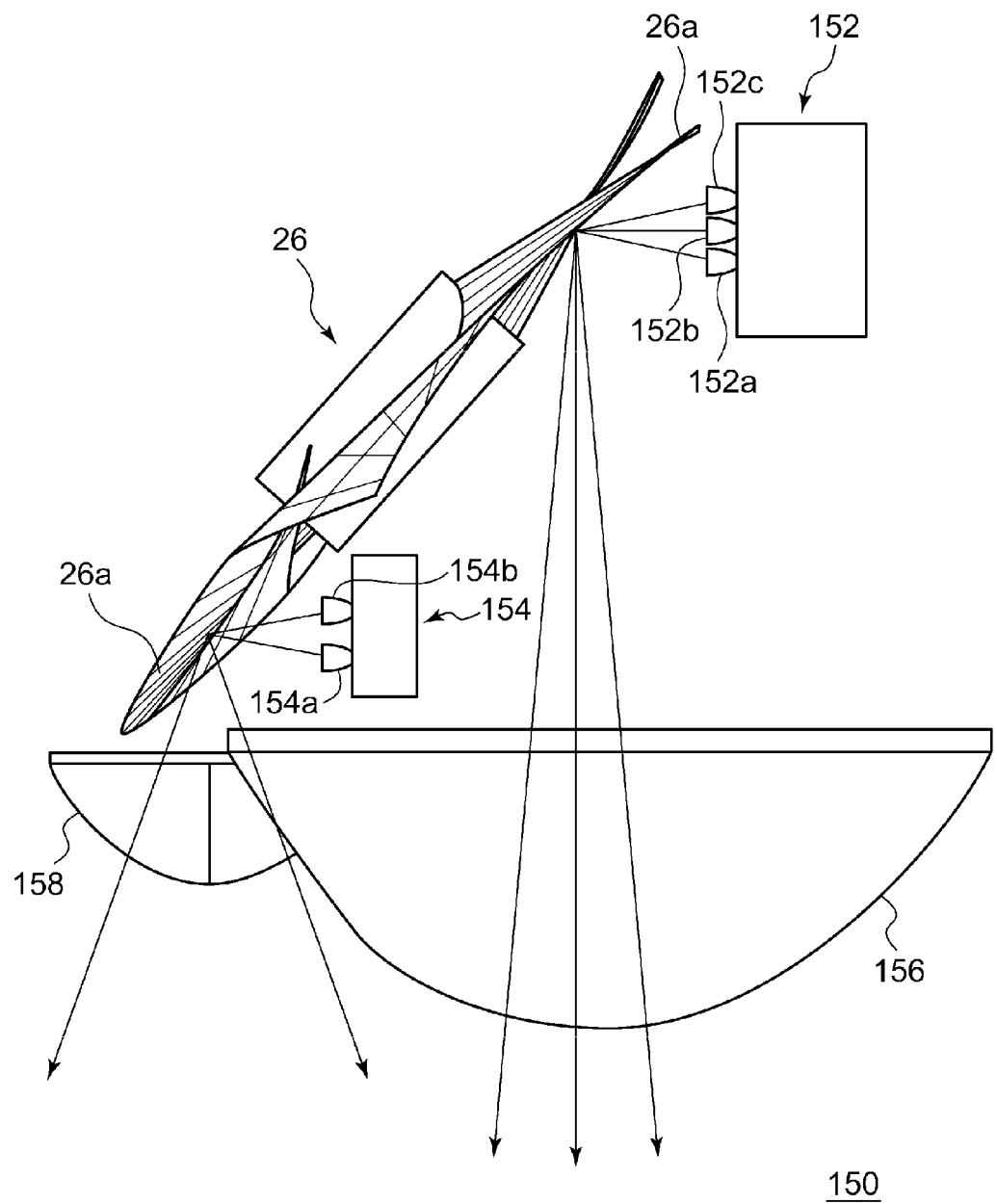
FIG. 19 is a top view schematically illustrating a configuration in which an optical unit according to Fifth Embodiment is included.

FIG. 19 is a top view schematically illustrating a configuration in which an optical unit according to Fifth Embodiment is included.

An optical unit 150 according to the present embodiment includes the rotating reflector 26 and a plurality of light sources each having LEDs as light emitting elements. Of the plurality of light sources, one light source 152 has a plurality of LED units 152a, 152b, and 152c. The plurality of LED units 152a, 152b, and 152c are ones for concentrating light and are arranged such that strong concentration of light, which is suitable for a light distribution pattern for high-beam and is oriented toward the front in the traveling direction, is achieved. Of the plurality of light sources, the other light source 154 has a plurality of LED units 154a and 154b. The plurality of LED units 154a and 154b are ones for diffusing light and are arranged such that diffuse light irradiating a wide range, which is suitable for a light distribution pattern for high-beam, is achieved. The number of the LED units included in each light source is not necessarily required to be two or more, but may be one when sufficient brightness can be achieved. In addition, it is not needed to always turn on all of the LED units, but part of which may be turned on in accordance with a situation where a vehicle travels and a forward state.

The light sources 152 and 154 are arranged such that the light emitted by each of them is reflected, by each of the blades in the rotating reflector 26 and at a position different from that of the other. Specifically, the LED units 152a, 152b, and 152c for concentrating light, which are included in the light source 152, are arranged such that the light emitted by each of them is reflected by the fan-shaped blade 26a located away from a first projection lens 156. Accordingly, a change in the position of the light source 152, which is generated by the light being reflected with the fan-shaped blade 26a, can be projected forward by the first projection lens 156 having a large focal length (low projection magnification). As a result, when a forward region is scanned by rotating the rotating reflector 26 and by using the light emitted from the light source 152, a light distribution pattern can be formed, in which a scanning range is not too wide and a narrow range is irradiated further brightly.

On the other hand, the LED units 154a and 154b for diffusing light, which are included in the light source 154, are arranged such that the light emitted by each of them is reflected by the fan-shaped blade 26a located nearer to a second projection lens 158. Accordingly, a change in the position of the light source 154, which is generated by the light being reflected with the fan-shaped blade 26a, can be projected by the second projection lens 158 having a small focal length (high projection magnification). As a result, when a forward region is scanned by rotating the rotating reflector 26 and by using the light emitted from the light source 154, a light distribution pattern can be formed, in which a scanning range is widened and a wide range is irradiated.

Thus, by arranging the plurality of light sources 152 and 154 such that the light emitted by each of them is reflected at a position on the reflecting surface of the rotating reflector 26, the position being different from that of the other, a plurality of light distribution patterns can be formed and a new light distribution pattern can also be formed by combining those light distribution patterns, and hence a further ideal light distribution pattern can be designed easily.

Subsequently, the position of each projection lens will be described. As described above, the light emitted from each of the light sources 152 and 154 is incident to each projection lens by being reflected with the blade 26a. For each projection lens, this is equivalent to the fact that light is incident from a secondary light source of each of the light sources 152 and 154, which is virtually formed on the back side of the blade 26a. When a light distribution pattern is formed by scanning with light, it is important to project and scan a clear light source image, the least blurred as much as possible, in order to increase resolution.

Accordingly, it is preferable that each projection lens is arranged such that the position of the focal point thereof matches the position of the secondary light source. However, when it is taken into consideration that: the positions of the secondary light sources of the light sources 152 and 154 are changed with the rotation of the blade 26a; and various irradiation patterns are required, the positions of all of the secondary light sources are not necessarily required to match those of the focal points of the projection lenses.

Based on such knowledge, for example, the first projection lens 156 is arranged such that at least one of the secondary light sources of the light source 152, which are formed by the reflection with the blade 26a, passes near to the focal point of the first projection lens 156. The second projection lens 158 is arranged such that at least one of the secondary light sources of the light source 154, which are formed by the reflection with the blade 26a, passes near to the focal point of the second projection lens 158.

Figure 20:
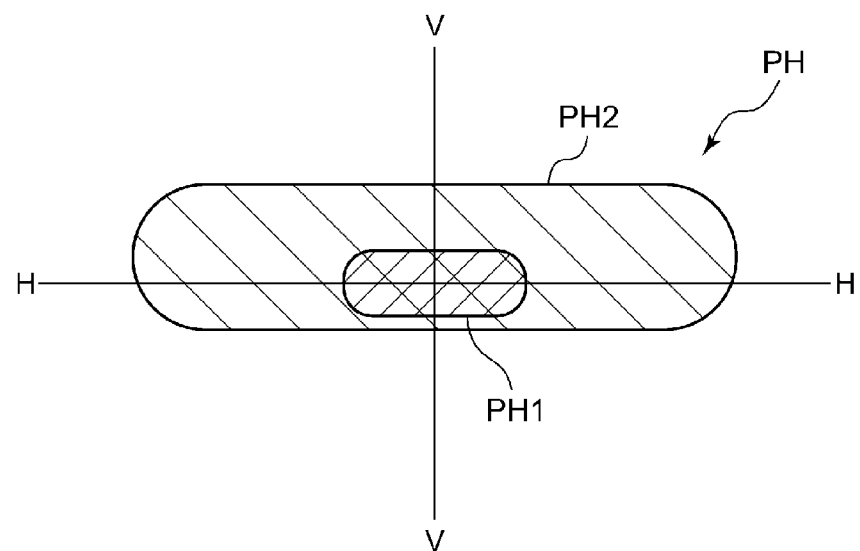
FIG. 20 is a view schematically illustrating a light distribution pattern formed by an automotive headlamp comprising the optical unit according to Fifth Embodiment.

FIG. 20 is a view schematically illustrating a light distribution pattern formed by an automotive headlamp comprising the optical unit according to Fifth Embodiment. The light distribution pattern for high-beam PH illustrated in FIG. 20 is composed of both a first light distribution pattern PH1, which is formed by the light source 152 and brightly irradiates the front ahead of a vehicle to a remote area, and a second light distribution pattern PH2, which is formed by the light source 154 and irradiates a wide range in front of the vehicle.

The optical unit 150 according to the present embodiment further includes both the first projection lens 156, which projects the light, emitted from the light source 152 and reflected by the rotating reflector 26, in the light radiation direction of the optical unit as the first light distribution pattern PH1, and the second projection lens 158, which projects the light, emitted from the light source 154 and reflected by the rotating reflector 26, in the light radiation direction of the optical unit as the second light distribution pattern PH2. Thereby, different light distribution patterns can be formed by the single rotating reflector by appropriately selecting each projection lens.

Figure 21A:
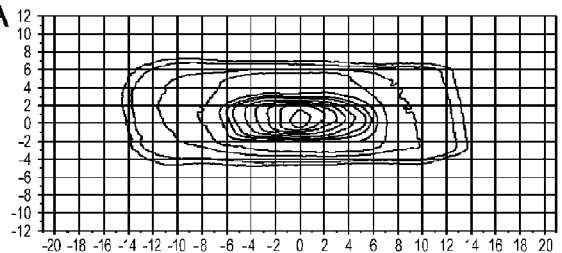
FIG. 21A is a view illustrating a light distribution pattern formed by respective light sources.
Figure 21B:
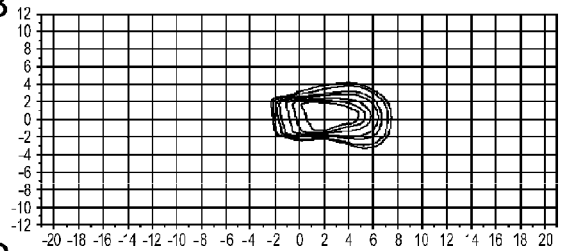
FIGS. 21B to 21F are views each illustrating an irradiation pattern formed by each of respective LED units.
Figure 21C:
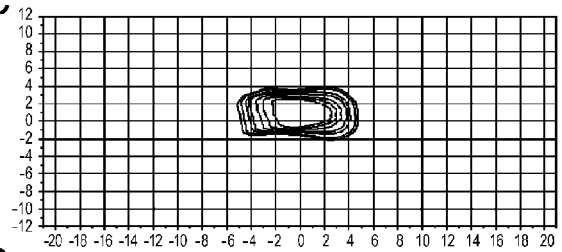
Figure 21D:
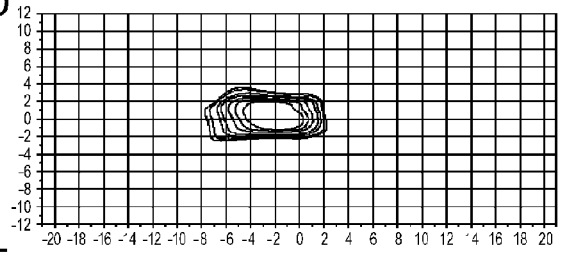
Figure 21E:
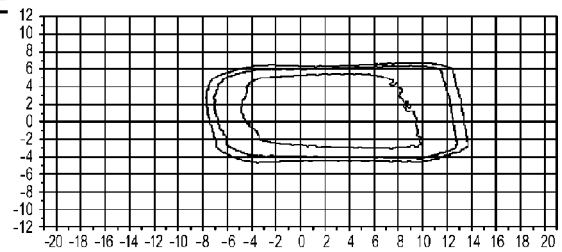
Figure 21F:
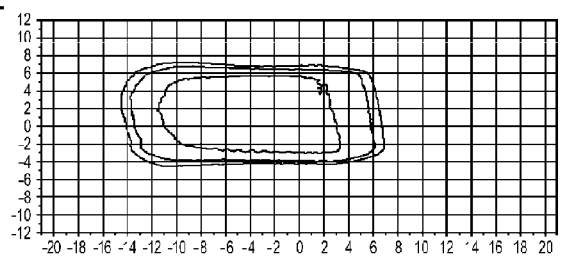

Subsequently, an irradiation pattern formed by each LED, by which the first light distribution pattern PH1 and the second light distribution pattern PH2 are formed, will be described. FIG. 21A is a view illustrating a light distribution pattern formed by the light sources 152 and 154, and FIGS. 21B to 21F are views each illustrating an irradiation pattern formed by each of the LED units 152a, 152b, 152c, 154a, and 154b. As illustrated in FIGS. 21B to 21D, the irradiation pattern formed by each of the LED units 152a, 152b, and 152c has a narrow irradiation region and a high maximum light intensity. On the other hand, as illustrated in FIGS. 21E and 21F, the irradiation pattern formed by each of the LED units 154a and 154b has a wide irradiation region, although a maximum light intensity is low. The light distribution pattern for high-beam illustrated in FIG. 21A can be formed by superimposing the irradiation patterns formed by the respective LEDs one on another.

Figure 22C:
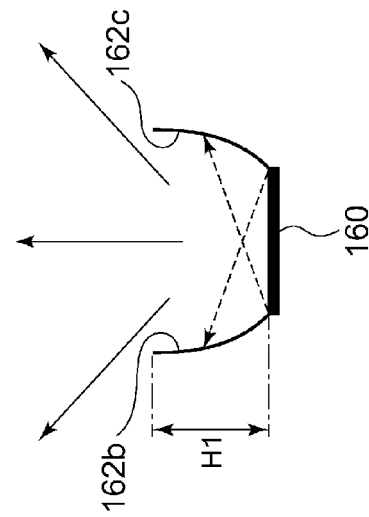
FIG. 22C is a sectional view, taken along D-D Line in FIG. 22A.
Figure 22B:
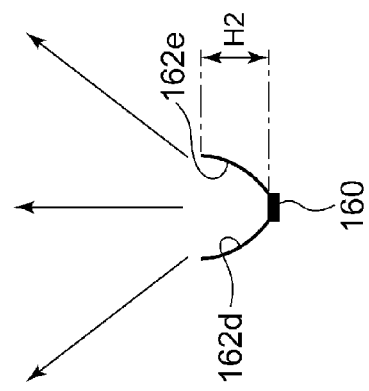
FIG. 22B is a sectional view, taken along C-C Line in FIG. 22A.
Figure 22A:
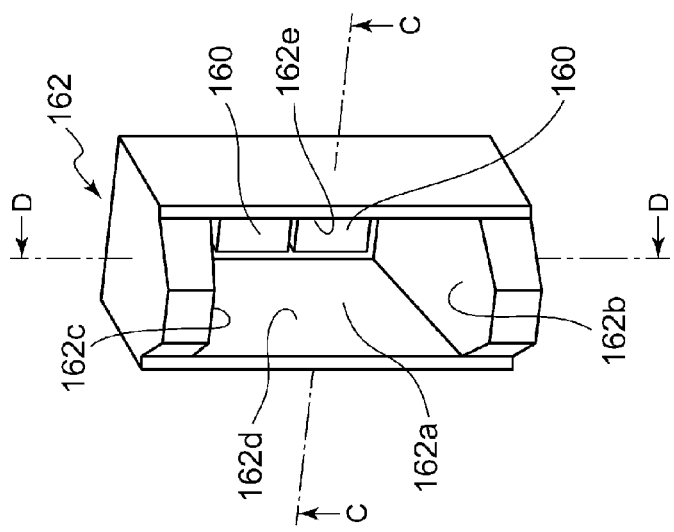
FIG. 22A is a perspective view of an LED unit according to Fifth Embodiment.

Subsequently, an LED unit included in each of the light sources 152 and 154 will be described in further detail. FIG. 22A is a perspective view of the LED unit according to Fifth Embodiment, FIG. 22B is a sectional view, taken along C-C Line in FIG. 22A, and FIG. 22C is a sectional view, taken along D-D Line in FIG. 22A. The LED unit 152a included in the light source 152 according to the present embodiment is formed by an LED 160 and a CPC 162 for concentrating the light from the LED 160. The LED units 152a, 152b, 152c, 154a, and 154b have the same configurations as each other, and hence the LED unit 152a will be described hereinafter as an example.

The CPC 162 is a member in which the LED 160 is arranged on the bottom thereof, and an opening 162a thereof has a rectangular shape. The CPC 162 has four side surfaces (light concentrating surfaces) 162b to 162e each being formed from the bottom toward the opening 162a so as to concentrate the light from the LED 160. The four side surfaces 162b to 162e have been subjected to mirror finishing such that each of them has a parabolic shape whose focal point is located at the LED 160 or a region near thereto. Thereby, the light emitted by the LED 160 is concentrated and reflected forward. Herein, the light emitted from the LED 160 is likely to be diffused in the longitudinal direction of the opening 162a, as illustrated by the dotted lines in FIG. 22C. Accordingly, if the heights of all of the side surfaces are the same as each other, there are sometimes the cases where, of the light emitted by the LED 160, the light moving toward the longitudinal direction of the opening 162a cannot be sufficiently concentrated. That is, part of the light emitted obliquely from the opening without being reflected by the side surface does not reach the reflecting surface of the rotating reflector 26.

Accordingly, in the CPC 162 according to the present embodiment, the four side surfaces are formed in the following way: a height H1 of each of the side surfaces 162b and 162c, which are present at both end portions in the longitudinal direction of the opening 162a, is larger than a height H2 of each of the side surfaces 162d and 162e, which are present at both the end portions in the short direction thereof. Thereby, occurrence of diffuse light that does not reach the reflecting surface of the rotating reflector, of the light from the LED 160, is suppressed and the light incident to each projection lens is increased, and hence the light from the light source can be efficiently used in lighting.

Figure 23A:
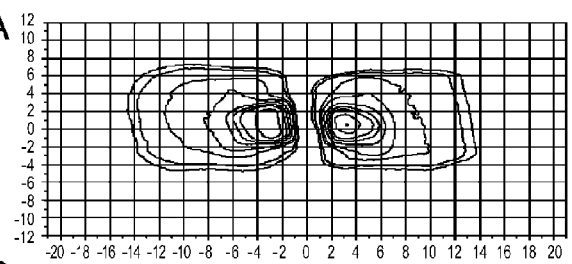
FIG. 23A is a view illustrating a light distribution pattern having a light-shielded portion formed by the respective light sources.
Figure 23B:
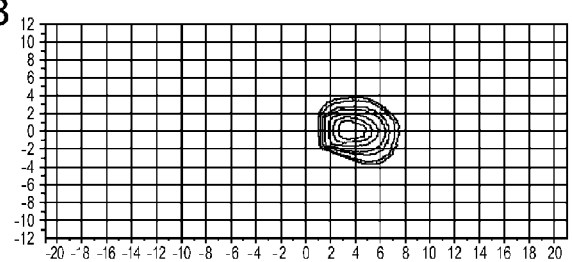
FIGS. 23B to 23F are views each illustrating an irradiation pattern having a light-shielded portion formed by each of the respective LED units.
Figure 23C:
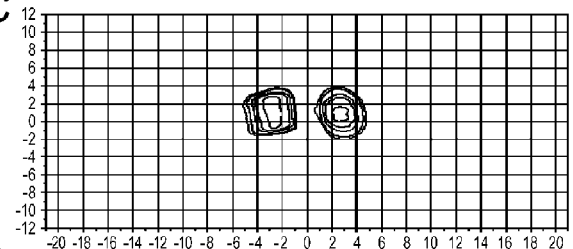
Figure 23D:
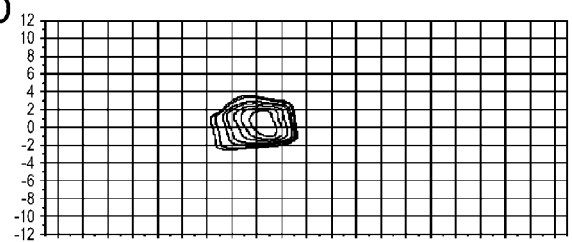
Figure 23E:
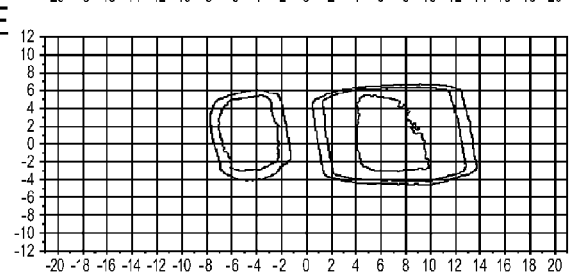
Figure 23F:
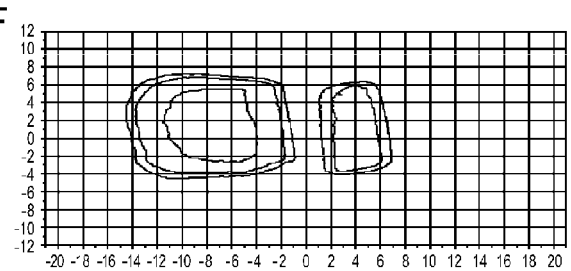

A light-shielded portion can also be formed in a light distribution pattern by using the optical unit 150 according to the present embodiment. FIG. 23A is a view illustrating a light distribution pattern having a light-shielded portion formed by the light sources 152 and 154, and FIGS. 23B to 23F are views each illustrating an irradiation pattern having a light-shielded portion formed by each of the LED units 152a, 152b, 152c, 154a, and 154b. As illustrated in FIGS. 23B to 23D, the irradiation pattern having a light-shielded portion formed by each of the LED units 152a, 152b, and 152c has a narrow irradiation region and a high maximum light intensity. On the other hand, as illustrated in FIGS. 23E and 23F, the irradiation pattern having a light-shielded portion formed by each of the LED units 154a and 154b has a wide irradiation region, although a maximum light intensity is low. The light distribution pattern for high-beam having a light-shielded portion, which is illustrated in FIG. 23A, can be formed by superimposing the irradiation patterns formed by each LED one on another.

(Sixth Embodiment)

Figure 24:
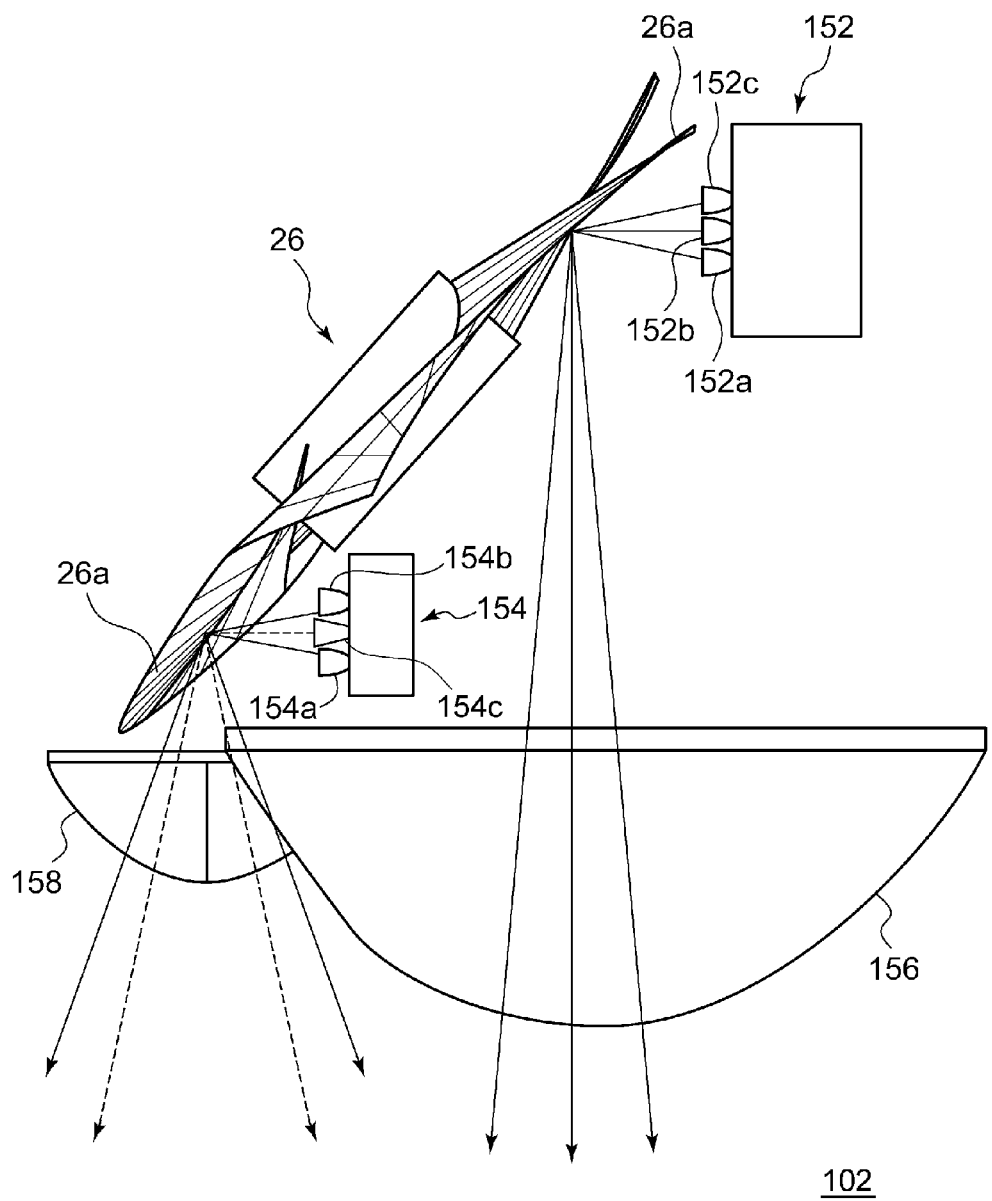
FIG. 24 is a top view schematically illustrating an obstacle detecting device according to Sixth Embodiment.
Figure 25:
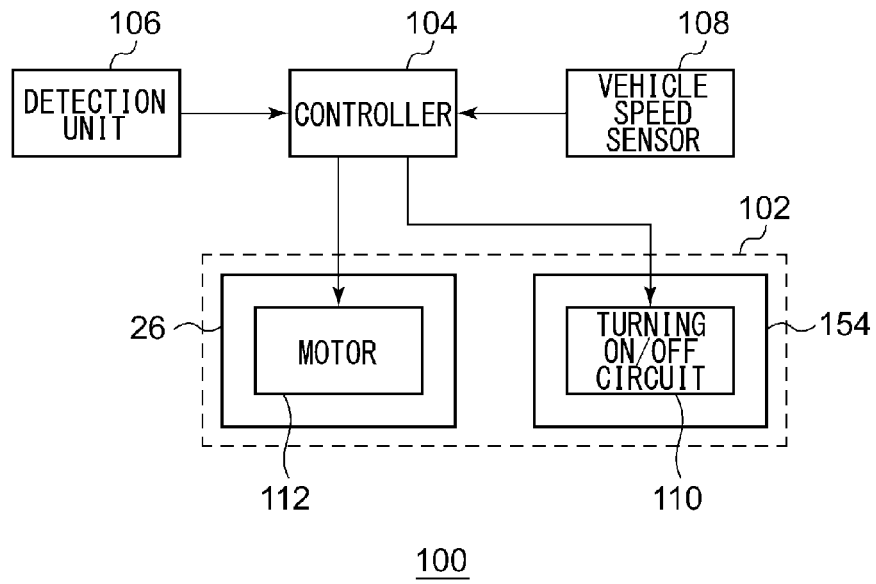
FIG. 25 is a block view of the obstacle detecting device according to Sixth Embodiment.

An obstacle detecting device can be formed by using the optical unit according to each of the aforementioned embodiments. FIG. 24 is a top view schematically illustrating an obstacle detecting device according to Sixth Embodiment. FIG. 25 is a block view of the obstacle detecting device according to Sixth Embodiment.

An obstacle detecting device 100 according to the present embodiment comprises an optical unit 102, a controller 104, a detection unit 106, and a vehicle speed sensor 108. The optical unit 102 has a configuration almost the same as that of the optical unit 150, except that, in the optical unit 102, an infrared light unit 154c is provided in the aforementioned optical unit 150 as a light emitting element for emitting infrared light.

That is, the obstacle detecting device 100 comprises: the light source 154 including both the LED units 154a and 154b as first light emitting elements for emitting visible lights and the infrared light unit 154c as a second light emitting element for emitting infrared light; and the rotating reflector 26 configured to be rotated in one direction around a rotational shaft while reflecting the visible light and infrared light emitted from the light source 154.

The rotating reflector 26 is configured to emit, by its rotating movement, the visible lights from the LED units 154a and 154b as irradiation beams such that a visible light distribution pattern is formed by scanning with the irradiation beams; and is configured to emit the infrared light from the infrared light unit 154c as an irradiation beam such that an infrared light distribution pattern is formed by scanning with the irradiation beam.

Accordingly, in the obstacle detecting device 100, a visible light distribution pattern can be formed by scanning with an irradiation beam by visible light, and an infrared light distribution pattern can be formed by scanning with an irradiation beam by infrared light, the above two formations being made possible by actions of the rotating reflector 26.

In the obstacle detecting device 100, the rotational shaft R of the rotating reflector 26 is provided to be approximately parallel to a scanning plane of the irradiation beam that scans in the horizontal direction by the rotation of the rotating reflector 26. Accordingly, the thickness of the obstacle detecting device 100 can be made small. Herein, the expression of being approximately parallel means that it is acceptable to be substantially parallel, without requiring that it is completely parallel. Accordingly, an error within a range not greatly impairing the advantages of the obstacle detecting device according to an aspect is acceptable.

Figure 26:
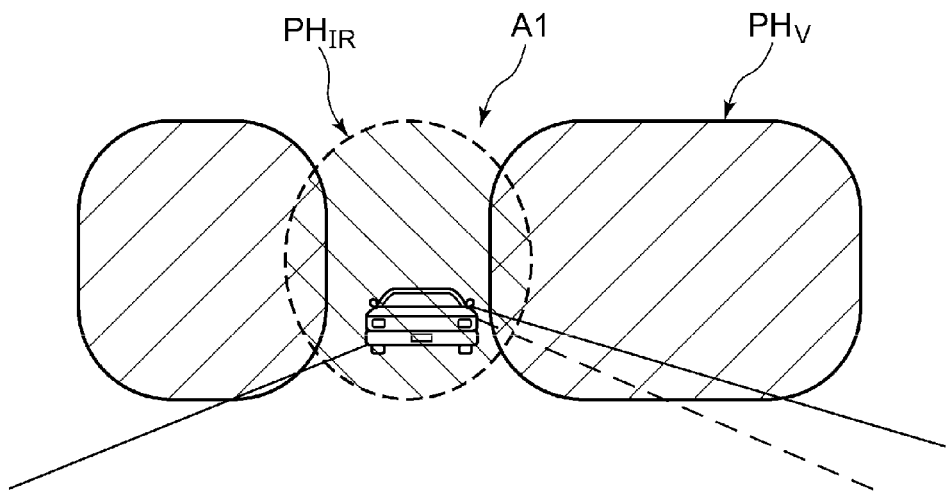
FIG. 26 is a view schematically illustrating each light distribution pattern formed by the obstacle detecting device according to Sixth Embodiment.

FIG. 26 is a view schematically illustrating each light distribution pattern formed by the obstacle detecting device 100 according to Sixth Embodiment. The obstacle detecting device 100 can form a visible light distribution pattern $PH_v$, in which an arbitrary region A1 is shielded from light as illustrated in FIG. 26, by synchronizing the timings of turning on/off the LED units 154a and 154b included in the light source 154 or a change in the light intensity with the rotation of the rotating reflector 26. In addition, the obstacle detecting device 100 can form an infrared light distribution pattern $PH_{IR}$, in which the arbitrary region A1 is irradiated as illustrated in FIG. 26, by synchronizing the timing of turning on/off the infrared light unit 154c included in the light source 154 or a change in the light intensity with the rotation of the rotating reflector 26.

In detailed description, the controller 104 (see FIG. 25) included in the obstacle detecting device 100 controls both a turning on/off circuit 110, which turns on/off the LED units 154a and 154b and the infrared light unit 154c, and a motor 112 in the rotating reflector 26. The controller 104 has an obstacle detection mode (control mode) in which: the lighting of each of the LED units 154a and 154b is turned off or reduced at a timing when an irradiation beam by visible light scans the partial region A1 of a light distribution pattern; and the infrared light unit 154c is turned on at a timing when an irradiation beam by infrared light scans another region including the region A1. Thereby, the obstacle detecting device 100 can scan the partial region A1 that has been scanned in a state where the lighting of each of the LED units 154a and 154b is turned off or reduced, while the infrared light unit 154c is being turned on.

Figure 27:
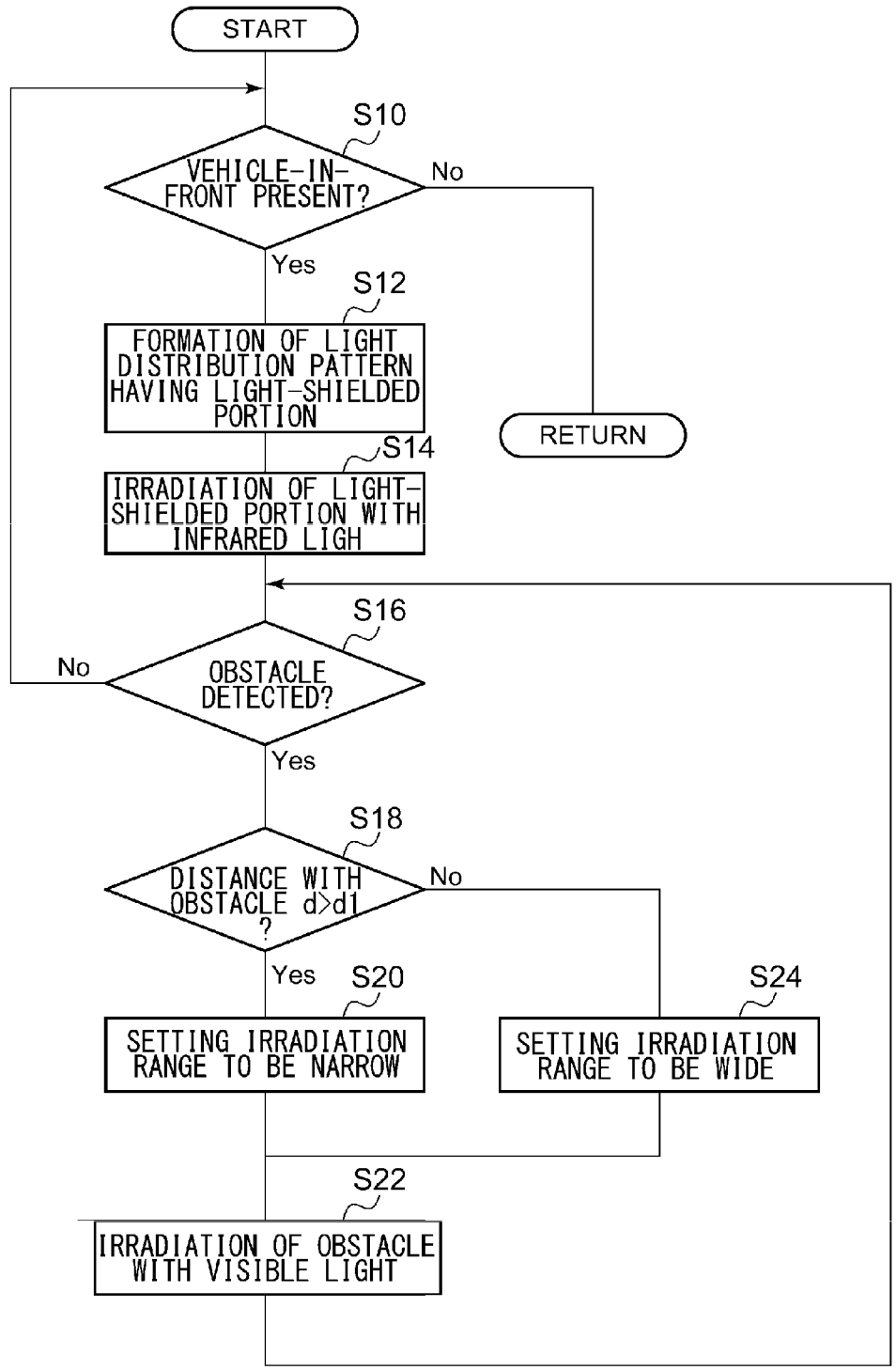
FIG. 27 is a flowchart for explaining an example of an obstacle detection mode in the obstacle detecting device according to the present embodiment.
Figure 28A:
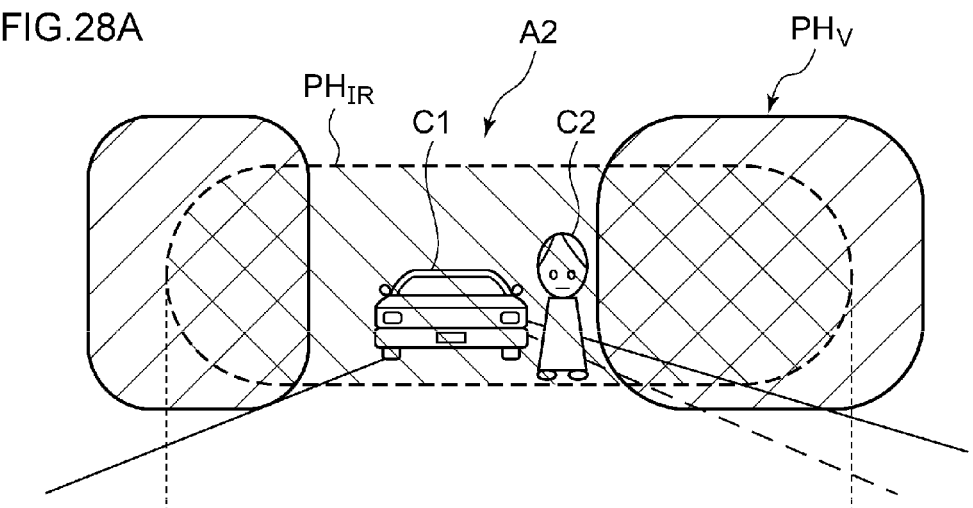
FIG. 28A is a view schematically illustrating an example of a light distribution pattern while the obstacle detection mode is being executed.
Figure 28B:
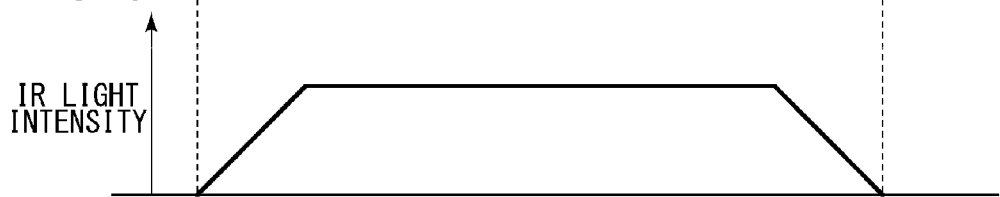
FIG. 28B is a view illustrating a change in the infrared light (IR) intensity in an infrared light distribution pattern PHIR.
Figure 29A:
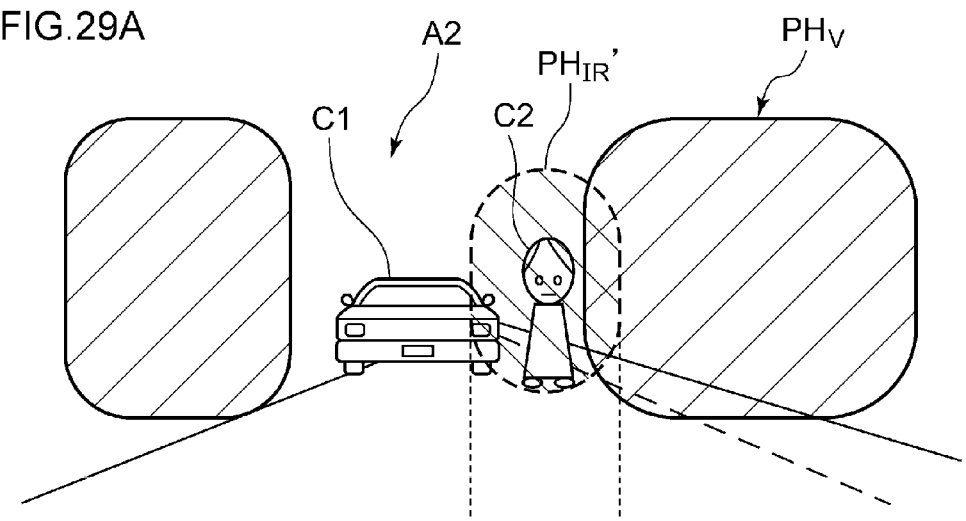
FIG. 29A is a view schematically illustrated an example of a light distribution pattern while the obstacle detection mode is being executed.
Figure 29B:
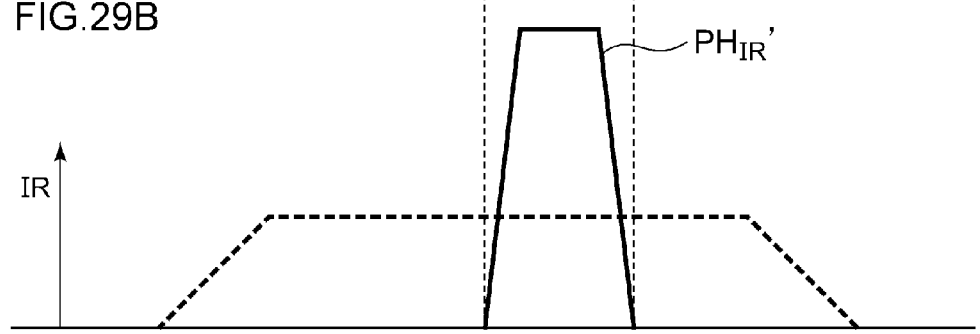
FIG. 29B is a view illustrating a change in the infrared light (IR) intensity in the infrared light distribution pattern PHIR.

Subsequently, the aforementioned obstacle detection mode will be described. FIG. 27 is a flowchart for explaining an example of an obstacle detection mode in the obstacle detecting device 100 according to the present embodiment. FIG. 28A is a view schematically illustrating an example of a light distribution pattern while the obstacle detection mode is being executed, FIG. 28B is a view illustrating a change in the infrared light (IR) intensity in the infrared light distribution pattern $PH_{IR}$, FIG. 29A is a view schematically illustrated an example of a light distribution pattern while the obstacle detection mode is being executed, and FIG. 29B is a view illustrating a change in the infrared light (IR) intensity in the infrared light distribution pattern $PH_{IR}$. The obstacle detection mode is executed automatically or in accordance with the selection by a driver while the automotive headlamp is being turned on, for example, during nighttime.

When the obstacle detection mode is initiated, it is determined, in the controller 104 and based on the information from the detection unit 106, whether another vehicle (vehicle-in-front) is present ahead of the driver's vehicle (S10). A millimeter wave radar, laser radar, far-infrared camera, or the like is used in the detection unit 106.

When it is determined that a vehicle-in-front is not present (S10/No), the state where a forward region is irradiated by a normal light distribution pattern for high-beam is maintained. On the other hand, when it is determined that a vehicle-in-front is present (S10/Yes), the visible light distribution pattern $PH_v$ is formed as illustrated in FIG. 28 (S12), in which a region A2 where a vehicle-in-front C1 is present is shielded from light. Because the region A2 is not irradiated by visible light in this state, it is difficult for a driver to recognize the situation in the region A2.

Accordingly, the obstacle detecting device 100 synchronizes, in this state, the timing of turning on/off the infrared light unit 154c in the light source 154 or a change in the light intensity with the rotation of the rotating reflector 26 such that the light-shielded region A2 is irradiated by infrared light. Thereby, the infrared light distribution pattern $PH_{IR}$ is formed as illustrated in FIG. 28 (S14), in which a region including the region A2 is irradiated by infrared light.

Detection of an obstacle is appropriately performed in this state (S16). The obstacle used herein means an object present on a road (e.g., a dropped object, dropped stone, failed vehicle, stopped vehicle, parked vehicle, etc.), a pedestrian, or the like. In the present embodiment, a camera (imaging unit), having a sensitivity in the infrared spectral range of infrared light, is used as the detection unit 106 in order to detect such an obstacle. Alternatively, means for external communication, such as navigation, road-to-vehicle communication, vehicle-to-vehicle communication, or the like, may be used as the detection unit 106 other than a camera or sensor.

A determination unit included in the controller 104 determines, based on the information on an image of the forward of a vehicle acquired by the camera, whether an obstacle that may hamper the traveling of the vehicle (e.g., a pedestrian C2 illustrated in FIG. 28), in other words, an obstacle required to be irradiated by visible light is present in the region A2. When determining that an obstacle is not present in the partial region A2 (S16/No), the controller 104 repeats the processing between Step S10 and Step S14.

When determining that an obstacle required to be irradiated by visible light is present in the partial region A2 (S16/Yes), the controller 104 controls the turning on of each of the LED units 154a and 154b such that the obstacle is irradiated by an irradiation beam by visible light. Thereby, it becomes easy for a driver to recognize that the obstacle is present in the partial region A2. When an object, which may become an obstacle, is captured by a camera or various radars before it is determined that an obstacle is present in the partial region A2, the controller 104 may control the turning on/off circuit 110 in order to form an infrared light distribution pattern $PH_{IR}'$ in which a narrow range including the object is irradiated by infrared light having a further high light intensity (see FIG. 29). Thereby, the accuracy in detecting an obstacle can be further improved. Alternatively, the obstacle detecting device 100 may form the infrared light distribution pattern $PH_{IR}$, in which a region including an obstacle is irradiated, after detecting the obstacle by the processing of Step S16, not detecting the obstacle after the infrared light distribution pattern $PH_{IR}$ is formed in advance by the processing of Step S14.

Figure 30A:
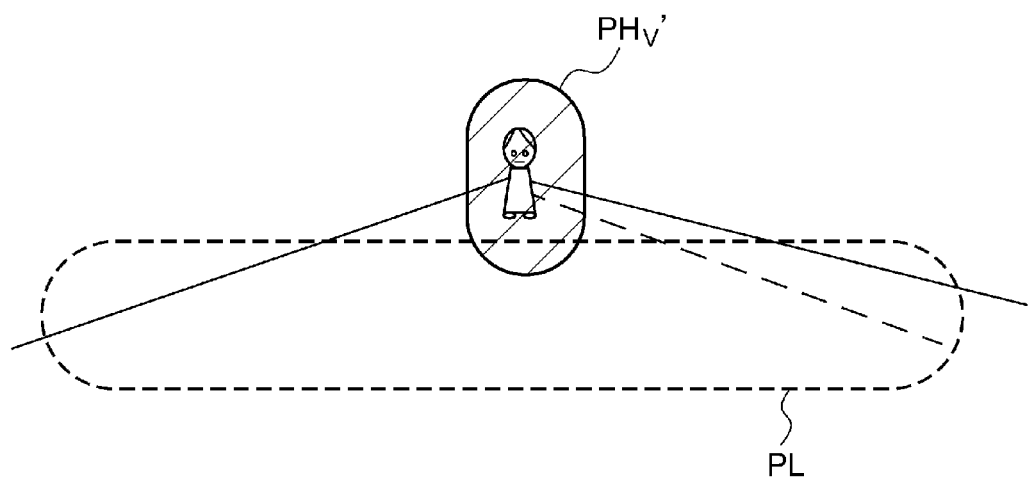
FIG. 30A is a view schematically illustrating an example of a light distribution pattern when a remote obstacle is detected.
Figure 30B:
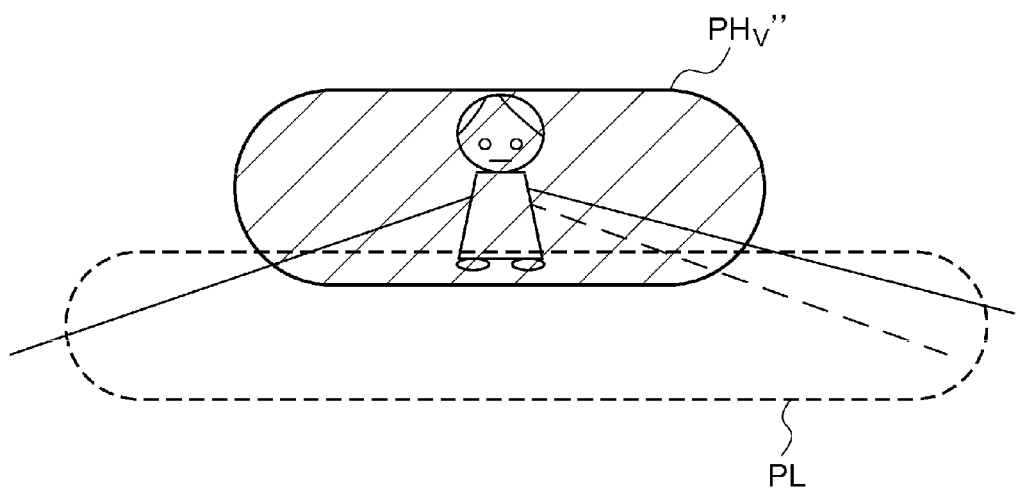
FIG. 30B is a view schematically illustrating an example of a light distribution pattern when a nearby obstacle is detected.

When an obstacle is irradiated by an irradiation beam by visible light, the controller 104 according to the present embodiment controls the turning on of each of the LED units 154a and 154b such that the range of a region including the obstacle, the range being irradiated by the irradiation beam by visible light, is changed in accordance with the distance between the driver's vehicle and the obstacle. FIG. 30A is a view schematically illustrating an example of a light distribution pattern when a remote obstacle is detected, and FIG. 30B is a view schematically illustrating an example of a light distribution pattern when a nearby obstacle is detected. Herein, a light distribution pattern for low-beam PL, illustrated by each of the regions enclosed by the dotted lines in FIGS. 30A and 30B, is formed by the lamp unit 18 illustrated in FIG. 1.

When an obstacle is detected in Step S16, the controller 104 determines whether the distance d between the driver's vehicle and the obstacle is larger than a predetermined value d1 (S18). Thereby, a light distribution pattern, suitable for the distance between the driver's vehicle and the obstacle, can be formed by visible light and attention of a driver can be attracted.

When the distance d between the driver's vehicle and the obstacle is larger than the predetermined value d1 (S18/Yes), it is considered that collision can be avoided by a brake operation. Accordingly, the controller 104 sets an irradiation range to be narrow around the obstacle (S20) and controls the light source 154 (S22) in order to form a visible light distribution pattern $PH_v'$ in which the narrow irradiation range including the obstacle is irradiated (see FIG. 30A), and then attention of a driver is attracted. On the other hand, when the distance d between the driver's vehicle and the obstacle is smaller than or equal to the predetermined value d1 (S18/No), it is considered that collision cab be avoided only by a steering operation. Accordingly, the controller 104 sets an irradiation range to be wide around the obstacle (S24) and controls the light source 154 (S22) in order to form a visible light distribution pattern $PH_v''$, and then urges a driver to move the vehicle toward the side of the obstacle. Herein, the relationship between the distance between the driver's vehicle and an obstacle and an irradiation range is not limited to the case of two steps as described above, but may be a function of multiple steps by providing a plurality of predetermined values that are threshold values.

As described above, the obstacle detecting device 100 can form a plurality of types of infrared light distribution patterns, in which irradiation ranges and light intensities are different from each other, by controlling the timing of turning on/off the infrared light unit 154c in the light source 154 or the magnitude of the light intensity thereof. In particular, when an IR-LED is adopted as the infrared light unit 154c, a large current, the magnitude of which is several times as large as a rated current, can be made flow when pulse-driven, and hence a light distribution pattern for concentrating light and that for diffusing light can be easily formed by the single infrared light unit 154c.

Figure 31A:
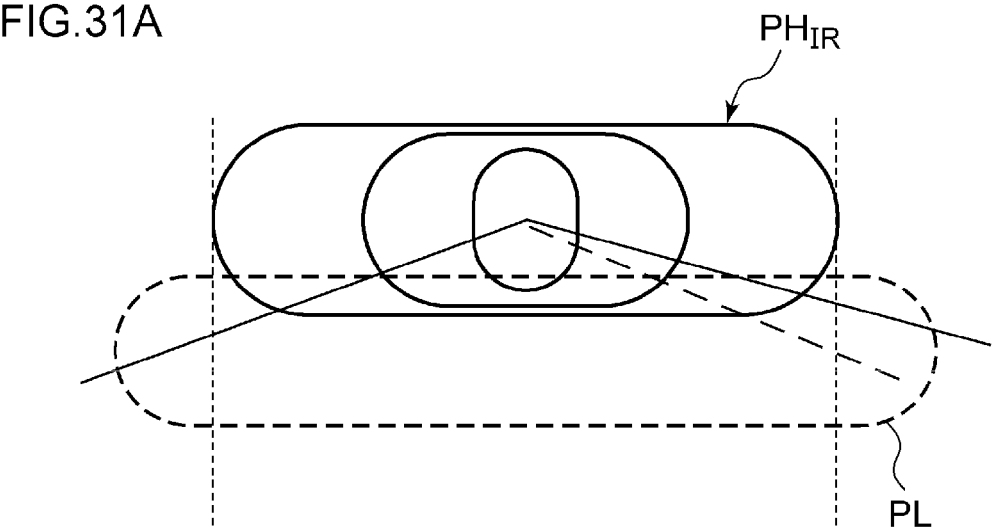
FIG. 31A is a view schematically illustrating an example of a light distribution pattern by an infrared projector whose irradiation range is fixed.
Figure 31B:
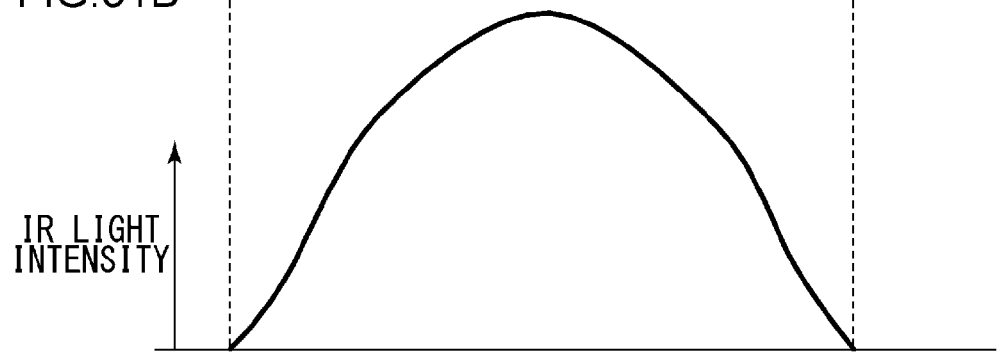
FIG. 31B is a view illustrating a change in the infrared light (IR) intensity in the infrared light distribution pattern PHIR.

When a vehicle is traveling at a low speed, it is generally needed to irradiate a wide range in order to monitor running out of a pedestrian from a surrounding area, etc. When a vehicle is traveling at a high speed, it is needed to strongly irradiate a center area in front of the vehicle in order to monitor a remote obstacle. Accordingly, when an infrared projector whose irradiation range is fixed is adopted, the light distribution pattern thereof is set such that both irradiation for a forward wide range by infrared light and that for a forward center range by infrared light having a high light intensity can be achieved. FIG. 31A is a view schematically illustrating an example of a light distribution pattern by an infrared projector whose irradiation range is fixed, and FIG. 31B is a view illustrating a change in the infrared light (IR) intensity in the infrared light distribution pattern $PH_{IR}$.

In actual traveling of a vehicle, however, it is hardly needed to monitor a remote area when traveling at a low speed, and it is also hardly needed to monitor a wide range when traveling at a high speed. Accordingly, in an infrared light projector whose irradiation range is fixed, irradiation energy is wasted.

On the other hand, in the obstacle detecting device 100 according to the present embodiment, a period of time, during which the infrared light unit 154c is being turned on, is short when a remote narrow range is irradiated, and hence, even when an instantaneous input power provided to the infrared light unit 154c is increased in order to increase the light intensity of infrared light to be emitted, an increase in the average power consumption of the infrared light unit 154c can be suppressed. On the other hand, the period of time, during which the infrared light unit 154c is being turned on, is long when a nearby wide range is irradiated; however, the light intensity of infrared light, which is required for the irradiation, becomes low, and hence an instantaneous input power provided to the infrared light unit 154c can be made small and an increase in the average power consumption of the infrared light unit 154c can be suppressed. Thus, a variation in the power consumption of the infrared light unit 154c can be suppressed by making the instantaneous input power, which is provided to the infrared light unit 154c when infrared light is emitted, to be inversely proportional to the size of an irradiation range.

Figure 32:
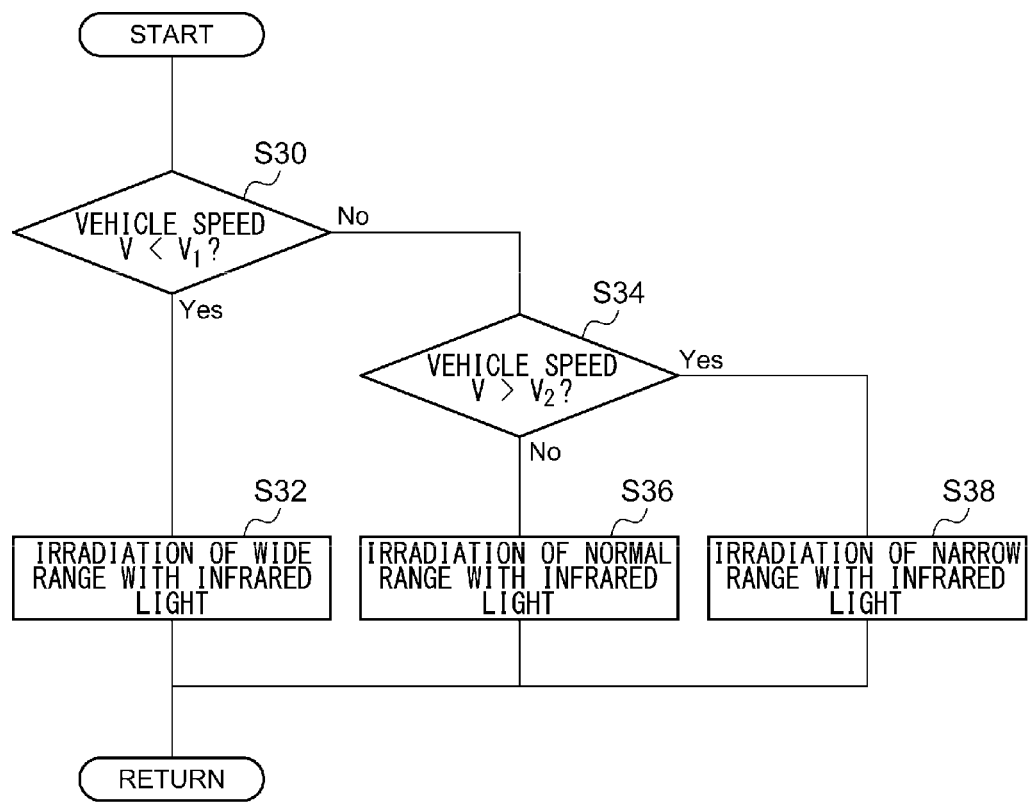
FIG. 32 is a flowchart for explaining an example of an irradiation range change mode in the obstacle detecting device according to the present embodiment.

FIG. 32 is a flowchart for explaining an example of an irradiation range change mode in the obstacle detecting device 100 according to the present embodiment. FIG. 33A is a view schematically illustrating an example of a light distribution pattern when a wide irradiation range is selected in the irradiation range change mode, FIG. 33B is a view illustrating a change in the infrared light (IR) intensity in an infrared light distribution pattern $PH_{IR}$ (W) in FIG. 33A, FIG. 33C is a view schematically illustrating an example of a light distribution pattern when a normal irradiation range is selected in the irradiation range change mode, FIG. 33D is a view illustrating a change in the infrared light (IR) intensity in an infrared light distribution pattern $PH_{IR}$ (M) in FIG. 33C, FIG. 33E is a view schematically illustrating an example of a light distribution pattern when a narrow irradiation range is selected in the irradiation range change mode, and FIG. 33F is a view illustrating a change in the infrared light (IR) intensity in an infrared light distribution pattern $PH_{IR}$ (N) in FIG. 33E.

The irradiation range change mode is executed automatically or in accordance with the selection by a driver while the automotive headlamp is being turned on, for example, during nighttime. When the irradiation range change mode is initiated, it is determined, in the controller 104 and based on the information from the vehicle speed sensor 108, whether the speed V of the driver's vehicle is higher than a predetermined speed $V_1$ (S30). When the vehicle speed V is lower than the predetermined speed $V_1$ (S30/Yes), the controller 104 controls the turning on/off circuit 110 such that the infrared light distribution pattern $PH_{IR}$(W) illustrated in FIG. 33A is formed in order to irradiate a wide range by infrared light (S32).

When the vehicle speed V is higher than or equal to the predetermined speed $V_1$ (S30/No)), it is determined, in the controller 104 and based on the information from the vehicle speed sensor 108, whether the driver's vehicle speed is higher than a predetermined speed $V_2$ (S34). When the vehicle speed V is lower than the predetermined speed $V_2$ (S34/No), the controller 104 controls the turning on/off circuit 110 such that the infrared light distribution pattern $PH_{IR}$(M) illustrated in FIG. 33C is formed in order to irradiate a normal range by infrared light (S36).

When the vehicle speed V is higher than the predetermined speed $V_2$ (S34/Yes), the controller 104 controls the turning on/off circuit 110 such that the infrared light distribution pattern $PH_{IR}$(N) illustrated in FIG. 33E is formed in order to irradiate a narrow range by infrared light (S38).

Thus, the obstacle detecting device 100 according to the present embodiment can change an irradiation range by infrared light and the light intensity of the infrared light in accordance with a vehicle speed, and hence the power consumption of the infrared light unit 154c can be greatly reduced.

Because infrared light has a reddish color, it is sometimes undesired in terms of vehicle appearance or regulations. Accordingly, in the obstacle detecting device 100, an influence by the redness of infrared light can be alleviated by appropriately superimposing a visible light distribution pattern formed by visible light, such as white light, while an infrared light distribution patter is being formed.

The present invention has been described above with reference to the aforementioned respective embodiments, but the invention is not limited to the aforementioned respective embodiments, and variations in which each component of the embodiments is appropriately combined or substituted are also encompassed by the invention. In addition, appropriate changes of the combinations or the orders of the processes in the aforementioned embodiments can be made and various modifications, such as design modifications, can be made with respect to the aforementioned embodiments, based on the knowledge of those skilled in the art, and embodiments in which such modifications are made can also be encompassed by the present invention.

For example, the automotive headlamp 10 can form, at a desired position, a spot light whose maximum light intensity is very high by stopping the rotating reflector 26 at an arbitrary angle, without rotating the rotating reflector 26. Thereby, it becomes possible to attract the attention of a driver by irradiating a specific obstacle (including a person) with bright spot light.

Alternatively, the LED units 154a and 154b and the infrared light unit 154c are not necessarily required to be formed integrally with each other as a light source, and may be formed separately from each other. In addition, the light emitted from each unit is not necessarily required to be reflected in the same regions in the rotating reflector 26, and the respective units may be arranged at positions such that each light is reflected by blades different from each other.

What is claimed is:

1. An obstacle detecting device comprising:
a light source including both a first light emitting element for emitting visible light and a second light emitting element for emitting infrared light; and
a rotating reflector configured to be rotated in one direction around a rotational shaft while reflecting the visible light and the infrared light emitted from the light source, wherein
the rotating reflector is configured, by its rotating movement: to emit the visible light from the first light emitting element as an irradiation beam such that a first light distribution pattern is formed by scanning with the irradiation beam; and to emit the infrared light from the second light emitting element as an irradiation beam such that a second light distribution pattern is formed by scanning with the irradiation beam, and wherein
the rotational shaft is provided to be approximately parallel to a scanning plane formed by continuously connecting the trajectories of the light of the irradiation beam that scans in the horizontal direction by the rotation of the rotating reflector.

2. The obstacle detecting device according to claim 1 further comprising:
a controller configured to control turning on/off of the first light emitting element and the second light emitting element, wherein
the controller has a control mode in which: the lighting of the first light emitting element is turned off or reduced at a timing when the irradiation beam by the visible light scans a partial region of the first light distribution pattern; and the second light emitting element is turned on at a timing when the irradiation beam by the infrared light scans another region including the partial region.

3. The obstacle detecting device according to claim 2 further comprising:
an imaging unit having a sensitivity in an infrared spectral range; and
a determination unit configured to determine whether an obstacle, which can impair traveling of a vehicle, is present in the partial region, based on an image acquired by the imaging unit, wherein
when the obstacle is present in the partial region, the controller controls the turning on of the first light emitting element such that the obstacle is irradiated by the irradiation beam by the visible light.

4. The obstacle detecting device according to claim 3, wherein
the controller controls the turning on of the first light emitting element such that a range of a region including the obstacle irradiated by the irradiation beam by the visible light is changed in accordance with a distance between a driver's vehicle and the obstacle.

* * * * *